(12) United States Patent
Sloan et al.

(10) Patent No.: US 10,922,419 B2
(45) Date of Patent: Feb. 16, 2021

(54) MONITORING INFORMATION-SECURITY COVERAGE TO IDENTIFY AN EXPLOITABLE WEAKNESS IN THE INFORMATION-SECURITY COVERAGE

(71) Applicant: Branch Banking and Trust Company, Winston-Salem, NC (US)

(72) Inventors: Stuart Sloan, Huntersville, NC (US); Aleksey Vladimirovich Rogozhin, Cary, NC (US); Glenn Bernstein, Durham, NC (US); Jesse Daniel Bikman, Durham, NC (US)

(73) Assignee: Truist Bank, Charlotte, NC (US)

(*) Notice: Subject to any disclaimer, the term of this patent is extended or adjusted under 35 U.S.C. 154(b) by 251 days.

(21) Appl. No.: 16/047,151

(22) Filed: Jul. 27, 2018

(65) Prior Publication Data
US 2019/0034639 A1 Jan. 31, 2019

Related U.S. Application Data

(60) Provisional application No. 62/537,515, filed on Jul. 27, 2017.

(51) Int. Cl.
| | |
|---|---|
| *G06F 21/57* | (2013.01) |
| *G06F 21/60* | (2013.01) |
| *G06F 17/30* | (2006.01) |
| *G06F 16/28* | (2019.01) |

(52) U.S. Cl.
CPC .......... *G06F 21/577* (2013.01); *G06F 16/285* (2019.01); *G06F 21/604* (2013.01); *G06F 2221/034* (2013.01)

(58) Field of Classification Search
CPC .... G06F 21/577; G06F 16/285; G06F 21/604; G06F 2221/034
See application file for complete search history.

(56) References Cited

U.S. PATENT DOCUMENTS

| | | | |
|---|---|---|---|
| 10,050,834 B1* | 8/2018 | Schick | H04L 41/0813 |
| 10,460,087 B2* | 10/2019 | Mahkonen | G06F 9/45558 |
| 10,652,263 B2* | 5/2020 | Heilig | H04L 45/70 |
| 10,721,252 B2* | 7/2020 | Murphy | H04L 63/164 |
| 10,735,443 B2* | 8/2020 | Murphy | G06K 9/6256 |

(Continued)

*Primary Examiner* — Yonas A Bayou
(74) *Attorney, Agent, or Firm* — Kilpatrick Townsend & Stockton LLP

(57) ABSTRACT

Systems and methods are provided for monitoring information-security coverage to identify a vulnerability or risk in the information-security coverage. An information-security system can include computing systems, databases, a security server, etc. that can communicate data via a network. The server can be used to obtain data indicating a process for managing or monitoring information-security in the system and data indicating activity on the network, computing systems, server, or databases. The server then determines a metric based on the obtained data and the metric can indicate a risk or vulnerability in information-security coverage in the system. The server can then aggregate the data and transmit the aggregated data to a computing device. The computing device can generate an interface for outputting data for monitoring information-security coverage or identifying a vulnerability or risk in information-security coverage, which can improve the security of the information-security system.

20 Claims, 12 Drawing Sheets

(56) References Cited

U.S. PATENT DOCUMENTS

| | | | |
|---|---|---|---|
| 10,735,444 B2* | 8/2020 | Murphy | G06F 21/561 |
| 10,742,629 B2* | 8/2020 | Krauss | G06F 9/445 |
| 10,749,895 B2* | 8/2020 | Arnell | H04L 63/1441 |
| 10,754,506 B1* | 8/2020 | Moyal | G06F 3/04842 |
| 2009/0178139 A1* | 7/2009 | Stute | G06Q 10/109 |
| | | | 726/22 |
| 2015/0381651 A1* | 12/2015 | Lietz | G06F 21/55 |
| | | | 726/23 |
| 2016/0203319 A1* | 7/2016 | Coen | G06Q 30/0631 |
| | | | 726/25 |

\* cited by examiner

MONITORING INFORMATION-SECURITY COVERAGE TO IDENTIFY AN EXPLOITABLE WEAKNESS IN THE INFORMATION-SECURITY COVERAGE

CROSS-REFERENCE TO RELATED APPLICATIONS

This disclosure claims priority to U.S. Provisional Application No. 62/537,515, titled "Monitoring Information-Security Coverage to Identify an Exploitable Weakness In The Information-Security Coverage," filed Jul. 27, 2017, the entirety of which is hereby incorporated by reference herein.

TECHNICAL FIELD

The present disclosure relates generally to information security. More specifically, but not by way of limitation, this disclosure relates to monitoring information-security coverage to identify a vulnerability or risk in the information-security coverage.

BACKGROUND

Information security can involve using various tools, devices, systems, or processes to monitor and prevent threats to digital and non-digital information. For example, the various tools or devices can be used to implement processes for protecting the information from access by an unauthorized user. In some instances, an information-security system can include a framework or protocol and the various tools or devices and the system can be evaluated to determine an efficiency of the system for protecting the information.

SUMMARY

Various embodiments of the present disclosure provide systems and methods for monitoring information-security coverage to identify a vulnerability or risk in the information-security coverage.

In one example, a method includes receiving, by a processing device, a data set associated with a framework for monitoring or managing information security. The data set includes data about a plurality of controls indicating processes for monitoring a security level of an information-security system or identifying an exploitable weakness of the information-security system. The method further includes receiving, by the processing device, a selection of a control of the plurality of controls. The method also includes receiving, by the processing device, detected information-security data. The detected information-security data indicates activity on a computing device, a network, a server, or a database over a period of time. The method also includes determining, by the processing device, a plurality of information-security metrics based on the detected information-security data. An information-security metric can be used for monitoring the security level of the information-security system or identifying the exploitable weakness of the information-security system over the period of time. The method also includes aggregating, by the processing device, the plurality of information-security metrics to form a plurality of information-security metric groups. The method further includes generating, by the processing device, an interface for display that includes data associated with the detected information-security data, the plurality of controls, or the plurality of information-security metrics for determining one or more processes for improving the security level of the information-security system or mitigating the identified exploitable weakness of the information-security system.

Additional features and advantages of exemplary embodiments of the present disclosure will be set forth in the description that follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

FIGS. 9-1 to 9-4 together form a graph depicting an example of relationships between various components of an information-security environment that can be used to monitor information-security coverage according to some aspects.

DETAILED DESCRIPTION

Figure 1:
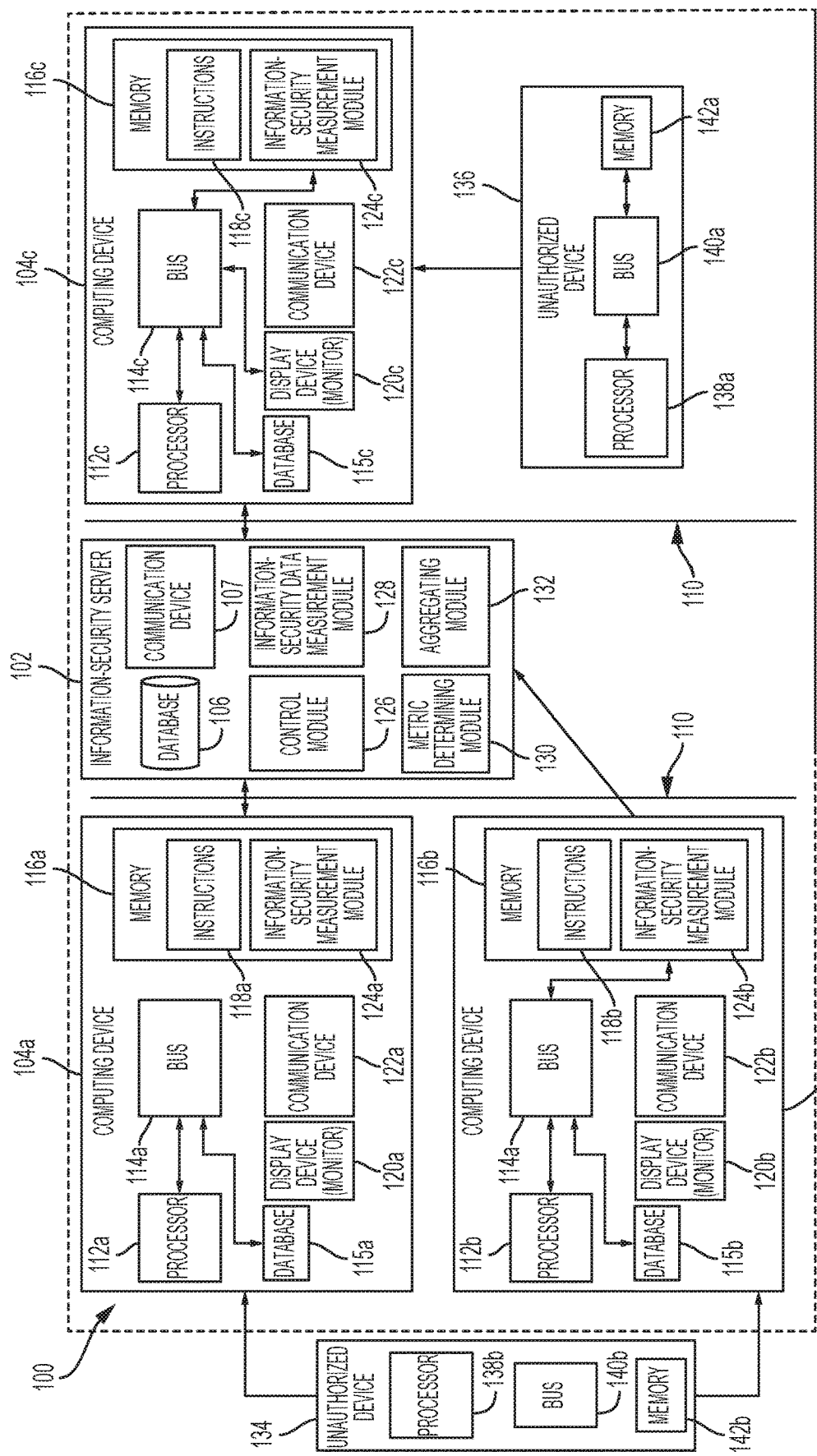
FIG. 1 is a block diagram of an example of an environment in which an information-security server can monitor information-security coverage to identify an exploitable weakness or risk in the information-security coverage according to some aspects.

Certain aspects and features of the present disclosure relate to a system of information-security measurement modules, metrics, controls, and frameworks that can be used to monitor information-security coverage. An information-security measurement module can include software residing on a computing system for monitoring the computing system or a network via which the computing system communicates. The information-security measurement modules provide data about the computing system or network and the data can be used to determine various metrics that indicate a level of security of information-security coverage. One or more interfaces can also be generated for providing the data obtained or the determined metrics to a user in response to user input indicating a request for the data or the metrics. The user can then determine whether the information-security measurement modules, the computing system, or the network complies with a particular process for maintaining information-security coverage. The information-security measurement modules can provide data about the computing system or network over a period of time and the data provided via the one or more interfaces can allow the user to determine an overall state of information-security coverage. As an example, the user can identify an exploitable weakness or risk in the information-security coverage based on the data and modify the computing systems, the networks, or the information-security measurement modules in response to identifying the risk. In some examples, an exploitable weakness can include a weakness in the information-security coverage that can allow an unauthorized device or an unauthorized user (e.g., a hacker or attacker) to reduce the computing system or network's information assurance, integrity, availability, or confidentiality.

For example, an information-security environment includes a server and various computing systems, databases, etc. The server can determine various metrics that indicate a risk or exploitable weakness in information-security coverage in the environment based on data obtained from various information-security measurement modules that reside on the computing systems and monitor activity and communication on a network and monitor the various computing systems, databases, etc. that communicate via the network. The information-security measurement modules can monitor the network, the computing systems, and databases based on a particular control. A control can include a particular process, policy, or procedure for managing or monitoring information-security in the environment (e.g., a number of systems or computing systems in the environment affected by a particular vulnerability in computational logic). An information-security measurement module residing on a computing system can provide data indicating a presence of a vulnerability in computational logic that, if exploited, can undermine the integrity, availability, or confidentiality of that computing system. A server can determine a metric that indicates a number of the computing systems in the environment that are associated with this particular vulnerability. Another example of a metric is one that is the result of comparing the data obtained to a threshold value. For example, the server can compare a tolerable number of computing systems in the environment associated with a specific vulnerability to the total number of computing systems in the environment and determine a metric based on the comparison. In this example, the metric can indicate a percentage of the computing systems in the environment in compliance with the control, which can indicate a risk or exploitable weakness in information-security coverage in the environment.

The information-security measurement modules can also monitor activity and communication on the network and monitor the various computing systems, databases, etc. that communicate via the network over a period of time (e.g., a week, month, year, or other period of time) and the server can determine various metrics based on data obtained from the information-security measurement modules. In this example, the metrics can indicate an overall state of information-security coverage in the information-security environment.

The server can also determine a maturity level of an information-security measurement module, which can indicate a reliability or strength of the information-security measurement module for providing data that can be used to determine metrics that indicate a risk or exploitable weakness in information-security coverage in the environment. For example, the server receives or obtains data indicating a quality of the data provided by an information-security measurement module and determines a maturity level of the information-security measurement module based on the data.

The server can determine a maturity level of a metric, which can indicate a reliability or strength of the metric for identifying an exploitable weakness or risk in information-security coverage in the environment (e.g., how useful the metric is for identifying an exploitable weakness in the environment). For instance, the server can receive data indicating one or more factors associated with the metric. Examples of the factors include, but are not limited to, a process for monitoring information security risk associated with the metric, a control associated with the metric, an availability of data for determining the metric, a method or process for delivering data for determining the metric, a quality of the data obtained or received by the server for determining the metric, etc. The server can determine a maturity level of the metric based on the data indicating a factor associated with the metric. As an example, the server receives data indicating an availability of data for determining the metric such as, for example, data indicating that none of the information-security measurement modules in the environment have a capability to detect whether a computing system in the environment is associated with a specific vulnerability. The information-security server can then determine that a particular metric (e.g., a number of computing systems in the environment associated with the specific vulnerability) has a low maturity level.

The server can be utilized to determine a weight value to be associated with each metric or obtain data indicating the weight value to be associated with each metric. The weight value associated with a metric can indicate an importance of the metric for protecting information in the environment.

The server can then aggregate the data obtained from the information-security measurement modules or aggregate the metrics generated based on a similarity among the data. The server can then transmit the data obtained from the various information-security measurement modules, the aggregated data, or the determined metrics to one or more user devices, which can generate one or more user interfaces to output the data for determining a security level of the environment.

In some examples, providing the various user interfaces can allow the user to determine whether the information-security measurement modules, computing systems, or network complies with a control. As an example, the various user interfaces can indicate whether a number of computing systems in the network with associated vulnerabilities surpasses a certain threshold. For example, a user interface can indicate that there is a high risk or exploitable weakness that an unauthorized user or device can undermine the integrity, availability, or confidentiality of a computing system in the environment if the number of computing systems in the environment with associated vulnerabilities is above the threshold. As another example, the various user interfaces can indicate an overall state of information-security coverage in the environment over a period of time. For example, a user interface can indicate that the environment has a low or weak state of information-security coverage if the number of computing systems in the environment with associated vulnerabilities is above the threshold over a period of time, which can also indicate to a user that there is a high risk or exploitable weakness that an unauthorized user or device can undermine the integrity, availability, or confidentiality of aa computing system in the environment.

Thus, in some instances, the system of information-security measurement modules, metrics, controls, and frameworks can be used to address various information-security related issues. For instance, one or more unauthorized users (e.g., a hacker) or unauthorized devices may attempt to undermine the integrity, availability, or confidentiality of data on the computing systems or on the network. In some instances, the unauthorized user or device attempts to gain such unauthorized access via an exploitable weakness in information-security coverage in the environment (e.g., via a computing system associated with a vulnerability and therefore vulnerable or susceptible to such attacks). An information-security measurement module can detect the exploitable weakness or risk (e.g., detect a number of computing systems with associated vulnerabilities) over a period of time and provide data indicating the exploitable weakness or risk over the period of time, which can allow the one or more computing systems to be modified to maintain the security and integrity of the computing system or the network and enhance a performance of the various computing systems or network. For example, a user can then identify the exploitable weakness or risk in information-security coverage and a computing system associated with a vulnerability can be adequately remediated (for example through updating computational logic) to prevent unauthorized access to the computing system and maintain the security of the computing system and the environment. In this example, preventing unauthorized access to the computing system can enhance a performance of the computing system (e.g., by preventing an unauthorized user or device from tampering with a function or performance of the computing system).

As another example, the various interfaces can include an interactive user interface graphically displaying data received from the server. The interactive user interface can align a framework with corresponding controls, metrics, and information-security measurement modules, which can allow the user to identify a gap or risk in information-security coverage (e.g., determine that the environment does not comply with one or more controls) and modify the information-security measurement modules, the computing system, or the network such that the environment is in compliance with the framework or one or more controls.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an example of an environment 100 in which an information-security server 102 can monitor information-security coverage to identify an exploitable weakness or risk in the information-security coverage. The environment 100 also includes computing devices 104a-c and each of the computing devices 104a-c can transmit data to, or receive data from, another computing device (e.g., another computing device in the environment 100 or any other computing device) or receive an indicia of user input (e.g., if a user programs the computing device to include data). The information-security server 102 can transmit data to, or receive data from, any device in the environment 100 (e.g., the computing devices 104a-c) or any other device. The information-security server 102 can store data received or obtained from any device in a database 106. The environment 100 also includes a network 110, which can be any network that facilitates communication of data by the computing devices 104a-c, the information-security server 102, or any other device in environment 100.

Each of the computing devices 104a-c can include one or more components for monitoring the computing device 104a-c, the network 110, the information-security server 102, the database 106, or any other device in the environment 100. The computing device 104a can include a processor 112a, a bus 114a, a database 115a, and a memory 116a. The processor 112a can execute one or more operations for operating the computing device 104a. The processor 112a can execute instructions 118a stored in the memory 116a to perform the operations. Non-limiting examples of the processor 112a include a Field-Programmable Gate Array ("FPGA"), an application-specific integrated circuit ("ASIC"), a microprocessor, etc.

The processor 112a can be communicatively coupled to the memory 116a via the bus 114a. The memory 116a may include any type of memory device that retains stored information when powered off. Non-limiting examples of the memory 116a include electrically erasable and programmable read-only memory ("EEPROM"), flash memory, or any other type of non-volatile memory. In some examples, at least some of the memory 116a can include a computer-readable medium from which the processor 112a can read instructions 118a. The computer-readable medium can include electronic, optical magnetic, or other storage devices capable of providing the processor 112a with computer-readable instructions or other program code. Non-limiting examples of a computer readable-medium include (but are not limited to) magnetic disk(s), memory chip(s), ROM, random-access memory ("RAM"), an ASIC, a configured processor, optical storage, or any other medium from which a computer processor can read instructions. The instructions 118a can include processor-specific instructions generated by a compiler or an interpreter from code written in any suitable computer-programming language, including, for example, C, C++, C #, etc.

The computing device 104a can include input/output interface components (e.g., a display device 120a and a communication device 122a). The computing device 104a can also include other input/output interface components such as a keyboard, a touch-sensitive surface, a mouse, and additional storage.

The computing device 104a can transmit or receive data via the communication device 122a. The communication device 122a can represent one or more of any components that facilitate a network connection. The communication device 122a may be wireless and can include wireless interfaces such as IEEE 802.11, Bluetooth, or radio interfaces for accessing cellular telephone networks (e.g., transceiver/antenna for accessing a CDMA, GSM, UMTS, or other mobile communications network). In another example, the communication device 122a can be wired and can include interfaces such as Ethernet, USB, IEEE 1394, or a fiber optic interface. The computing device 104a can transmit or receive data (e.g., transmit data to the computing device 104b-c, the information-security server 102, the database 106, or another device in the environment 100) via the communication device 122a. The computing device 104a can also transmit data to a remote location (e.g., an offsite location or another computing device outside the environment 100) via the communication device 122a. In the example shown in FIG. 1, the computing device 104a can transmit and receive data via a wireless interface. In other examples, the computing device 104a can transmit and receive data via a wired interface.

The memory 116a can include an information-security measurement module 124a. The information-security measurement module 124a can include one or more instructions stored on a computer-readable storage medium (e.g., the memory 116a) and executable by the processor 112a. When executed by the processor 112a, the computer-executable instructions cause the processor 112a to monitor the network 110, the computing device 104a, the information-security server 102, the database 106, or any other device in the environment 100. In additional or alternative embodiments, the information-security measurement module 124a includes hardware, such as a special purpose processing device to perform a function or group of functions. Additionally or alternatively, the information-security measurement module 124a includes a combination of computer-executable instructions and hardware for monitoring the network 110, the computing device 104a, the information-security server 102, the database 106, or any other device in the environment 100. Examples of the information-security measurement module 124a include, but are not limited to, RSA® Archer Information Management System, PhishGuru™, Qualys®, ServiceNow®, Websense, SharePoint, WorkDay, etc.

For example, the computing device 104a can use the information-security measurement module 124a to detect activity on the computing devices 104a-c, the network 110, the information-security server 102, or the database 106. Detecting activity using the information-security measurement module 124a can include detecting operations or processes performed by, or on, the computing devices 104a-c, the network 110, the information-security server 102, or the database 106. As another example, detecting activity using the information-security measurement module 124a can include detecting data communicated among the computing devices 104a-c, the information-security server 102, and the database 106 via the network 110. Detecting activity using the information-security measurement module 124a can also include detecting an attempt to gain unauthorized access to the computing device 104a, the network 110, the information-security server 102, or the database 106. For example, one or more unauthorized devices 134, 136 or unauthorized users (e.g., a hacker) outside the environment 100 may attempt to gain unauthorized access to the environment 100 (e.g., gain access to data on the computing devices 104a-c or on the information-security server 102) and the information-security measurement module 124a can detect the attempt. The unauthorized devices 134, 136 can include a processor 138a-b, a bus 140a-b, and a memory 142a-b, each of which can be configured in substantially the same manner as the processor 112a, the bus 114a, and the memory 116a, although they need not be. In some examples, the activity detected using the information-security measurement module 124a can be used to determine a security level of the environment 100.

The computing device 104a can use the information-security measurement module 124a to detect or monitor activity on the computing devices 104a-c, the network 110, the information-security server 102, or the database 106 over a period of time, such as, for example, a week, month, year, or other period of time. The computing device 104a can store data indicating the detected or monitored activity in the database 115a.

Each information-security measurement module 124a-c can detect different types of activity on the computing device 104a-c, the network 110, the information-security server 102, or the database 106. In some examples, each information-security measurement module 124a-c can detect the same type of activity on the computing device 104a-c, the network 110, the information-security server 102, or the database 106.

The information-security server 102 can be used for storing or processing data from the computing devices 104a-c. The information-security server 102 can be any computing system or storage device and can include a communication device 107. The communication device 107 can be configured in substantially the same manner as communication devices 122a-c. The computing devices 104a-c can communicate with the information-security server 102 via respective communication devices 122a-c and the communication device 107. In some examples, the information-security server 102 can transmit data to each of the computing devices 104a-c. In some examples, the computing devices 104a-c can each transmit data to the information-security server 102.

The information-security server 102 can include one or more components for monitoring information-security coverage in the environment 100. For example, the information-security server 102 can include a control module 126, an information-security data sensing module 128, a metric determining module 130, and an aggregating module 132. Each module 126, 128, 130, and 132 can include one or more instructions stored on a computer-readable storage medium and executable by the information-security server 102. When executed by the information-security server 102, the computer-executable instructions cause the information-security server 102 to perform one or more functions for monitoring information-security coverage to identify an exploitable weakness or risk in the information-security coverage in the environment 100. In additional or alternative embodiments, the modules 126, 128, 130, and 132 include hardware, such as a special purpose processing device to perform a function or group of functions. Additionally or alternatively, the modules 126, 128, 130, and 132 include a combination of computer-executable instructions and hardware for monitoring information-security coverage to identify an exploitable weakness or risk in the information-security coverage in the environment 100.

The information-security server 102 can include the control module 126, which can be used to receive or obtain data. The information-security server 102 can receive or obtain the data from another computing device or system (e.g., the computing devices 104a-c, another server, a database, or another computing device) or from user input (e.g., if a user programs the information-security server 102 to include the data). The data can indicate various controls that each correspond a procedure or process for managing or monitoring a level of security of information or communications in the environment 100. For example, a control indicates a procedure for monitoring a level of security of communication among the computing devices 104*a-c*, the information-security server 102, and the database 106 or monitoring a level of security of information stored on the computing devices 104*a-c*, the information-security server 102, or the database 106. As another example, each control can indicate a procedure for mitigating an exploitable weakness of components of the environment (e.g., the computing devices 104*a-c*, the information-security server 102, the database 106, or the network 110) to access by an unauthorized user or unauthorized devices 134, 136.

The information-security server 102 can also include the information-security data sensing module 128 that can receive data from an information-security measurement module 124*a-c*. The data can correspond to activity on the computing device 104*a-c*, the network 110, the information-security server 102, or the database 106 detected by the information-security measurement module 124*a-c*. The information-security data sensing module 128 can be used to transmit signals to the information-security measurement modules 124*a-c*. A signal can be based on a control received by the information-security server 102 (e.g., using the control module 126). The signal can cause the information-security measurement modules 124*a-c* to detect activity associated with the control (e.g., detect activity associated with a particular procedure for monitoring or managing information-security) and transmit data indicating the detected activity to the information-security data sensing module 128.

In some examples, the information-security data sensing module 128 can receive data from an information-security measurement module 124*a-c* over a period of time (e.g., a day, week, month, year, or any other suitable period of time).

The information-security data sensing module 128 can also be used to store data. For example, the information-security data sensing module 128 can cause the information-security server 102 to store at least some of the data received from the information-security measurement modules 124*a-c* in the database 106.

The information-security server 102 can also include the metric determining module 130, which can be used to process data. The metric determining module 130 can be electrically or communicatively coupled to the information-security data sensing module 128 and can receive data obtained or stored by the information-security data sensing module 128 and process the data. The metric determining module 130 can be used to process the obtained or stored data to determine or generate a metric based on the data. A metric can indicate a level of security of information-security coverage in the environment 100. As an example, the metric determining module 130 can determine a metric that indicates a number of computing devices 104*a-c* in the environment associated with a vulnerability. As another example, the metric determining module 130 can determine a metric by comparing the data obtained or stored to a metric threshold. For example, the metric determining module 130 can determine a metric threshold or receive data indicating a metric threshold (e.g., from another computing device or from user input) and the metric determining module 130 can compare the metric threshold to the data obtained or stored by the information-security data sensing module 128. In some examples, a metric generated or determined by the metric determining module 130 can indicate a risk or exploitable weakness in information-security coverage in the environment 100.

In some examples, the metric determining module 130 can obtain or receive data obtained or stored by the information-security data sensing module 128 over a period of time. The metric determining module 130 can determine or generate various metrics over the period of time that can indicate an overall state of information-security coverage in the environment 100 over the period of time. As an example, the metric determining module 130 can determine a metric that indicates a number of computing devices 104*a-c* in the environment associated with an associated vulnerability over a period of one year. The metric can indicate an overall state of information-security coverage in the environment 100 over the one year period. For example, the metric can indicate that the environment 100 has a low or weak state of information-security coverage if the number of computing devices 104*a-c* in the environment with an associated vulnerability is above a threshold value over the one year period, which can also indicate that there is a high risk or exploitable weakness in information-security coverage in the environment 100.

The metric determining module 130 can be used to receive data indicating a maturity level of the information-security measurement modules 124*a-c*, which can indicate a reliability of the information-security measurement module 124*a-c* for providing data that can be used to determine metrics or a reliability of the data provided by the information-security measurement module 124*a-c* for determining metrics. In some examples, the metric determining module 130 can be used to determine the maturity level of the information-security measurement modules 124*a-c*. For example, the metric determining module 130 receives or obtains data indicating a quality of the data provided by the information-security measurement module 124*a* for determining a metric and the metric determining module 130 determines a maturity level of the information-security measurement module 124*a* based on the data. As an example, the metric determining module 130 can determine that the information-security measurement module 124*a* has a high maturity level if the data received or obtained by the metric determining module 130 indicates that the data provided by the information-security measurement module 124*a* is of a high quality (e.g., data indicating that the data is reliable for determining metrics).

The metric determining module 130 can also be used to receive data indicating a maturity level of a determined metric (e.g., from another computing device or from user input). The maturity level of a metric can indicate a reliability or strength of the metric for identifying an exploitable weakness or risk in information-security coverage in the environment 100. As an example, the metric determining module 130 can determine a metric that indicates that none of the computing devices 104*a-c* complies with a particular control, which may indicate a risk or exploitable weakness of information-security coverage in the environment 100. In this example, one or more of the information-security measurement modules may not be detecting activity or providing data associated with the particular control, which may cause the metric to have a low maturity level. The low maturity level of the metric can indicate that the metric is not sufficiently reliable for identifying an exploitable weakness or risk in information-security coverage in the environment.

The metric determining module 130 can also determine a maturity level of a determined metric. For example, the metric determining module 130 can receive data indicating one or more factors associated with the determined metric, which can be used to determine the maturity level of the metric. Examples of such factors include, but are not limited to, a process for monitoring information security risk associated with the metric, a control associated with the metric, an availability of data for determining the metric (e.g., whether an information-security measurement modules 124a-c is providing data for determining the metric), a method or process for delivering data for determining the metric (e.g., whether the information-security measurement module 124a-c are automatically providing data for determining the metric), a quality of the data obtained or received by the server for determining the metric (e.g., a maturity level of an information-security measurement module 124a-c providing data for determining the metric), etc. The metric determining module 130 can determine a maturity level of the metric based on the data indicating a factor associated with the metric.

As an example, the metric determining module 130 receives or obtains data indicating an availability of data for determining the metric such as, for example, data indicating that none of the information-security measurement modules 124a-c in the environment 100 can detect whether computing devices 104a-c in the environment 100 are associated with one or more vulnerabilities. The metric determining module 130 can determine that a particular metric (e.g., a number of computing devices 104a-c in the environment associated with one or more vulnerabilities) has a low maturity level in response to determining that the data for determining the metric is sparse or unavailable.

The metric determining module 130 can also be used for determining a weight value associated with a metric. In another example, the metric determining module 130 can be used to obtain data indicating a weight value associated with a metric (e.g., from another computing device or from user input). A weight value associated with a metric can indicate an importance of the metric for protecting information in the environment 100 (e.g., protecting information or data exchanged among the computing devices 104a-c, the information-security server 102, and the database 106 via the network 110 or protecting information or data on the computing devices 104a-c, the information-security server 102, or the database 106). In some examples, the metric determining module 130 can be utilized to determine a weight value associated with the metric based on the maturity level of the metric. For example, the metric determining module 130 can determine that a metric that has a low maturity level has a low weight value.

The information-security server 102 can also include the aggregating module 132. The aggregating module 132 can be electrically or communicatively coupled to the information-security data sensing module 128 and the metric determining module 130. The aggregating module 132 can receive or obtain data from the information-security data sensing module 128 or the metric determining module 130. The aggregating module 132 can be used to aggregate data obtained from the information-security data sensing module 128 or the metric determining module 130, which can include grouping the data based on a similarity.

In some examples, the aggregating module 132 receives or obtains data from the information-security data sensing module 120 or the metric determining module 130 over a period of time, such as, for example, a day, week, month, year, etc. and aggregates the data obtained or received over the period of time.

The information-security server 102 can transmit data to the computing devices 104a-c and the computing devices 104a-c can generate an interface for outputting or displaying data obtained or received from the information-security server 102. For example, the computing devices 104a-c can generate an interface for outputting data from the information-security data sensing module 128, the metric determining module 130, or the aggregating module 132. The computing devices 104a-c can output the data for monitoring information-security coverage in the environment 100.

For example, the computing devices 104a-c can obtain aggregated data from the aggregating module 132 and output the data for identifying an exploitable weakness in information-security coverage in the environment 100, which can improve the security of information in the environment 100. For example, the data displayed can indicate that a control is not associated with an information-security measurement module 124a-c (e.g., the information-security measurement modules 124a-c are not detecting activity or providing data associated with the control), which can indicate a risk or exploitable weakness in the information-security coverage. As another example, the data displayed can indicate that the control module 126 did not obtain or receive data indicating one or more desired controls, which can indicate an exploitable weakness in the information-security coverage. As still another example, the data displayed can indicate an overall state of information-security coverage in the environment 100 over a period of time. For example, the interface can indicate that the environment 100 has a low or weak state of information-security coverage if the number of computing devices 104a-c in the environment 100 containing computational logic associated with one or more vulnerabilities is above a tolerable threshold over the period of time, which can indicate to a user that there is a high risk or exploitable weakness in the information-security coverage.

In some examples, one or more of the information-security measurement modules 124a-c, metrics, or controls can be modified based on the identified exploitable weakness. As another example, the computing devices 104a-c can output the aggregated data for selecting a process for mitigating or eliminating the identified exploitable weakness in information security risk coverage.

The computing devices 104a-c can generate one or more interactive user interfaces for outputting or displaying data obtained or received from the information-security server 102. The interactive user interface can align a framework with corresponding controls, metrics, and information-security measurement modules 124a-c, which can allow the user to identify a gap or risk in information-security coverage (e.g., determine that the environment 100 does not comply with one or more controls) and modify the information-security measurement module 124a-c, the computing devices 104a-c, or the network 110 such that the environment 100 is in compliance with the framework or the one or more controls.

While in the example above, the information-security server 102 transmits data to the computing devices 104a-c and the computing devices 104a-c generate an interface for outputting the data, the present disclosure is not limited to such configurations. Rather, in other examples, the information-security server 102 can generate one or more interfaces for outputting data from the information-security data sensing module 128, the metric determining module 130, or the aggregating module 132.

Figure 2:
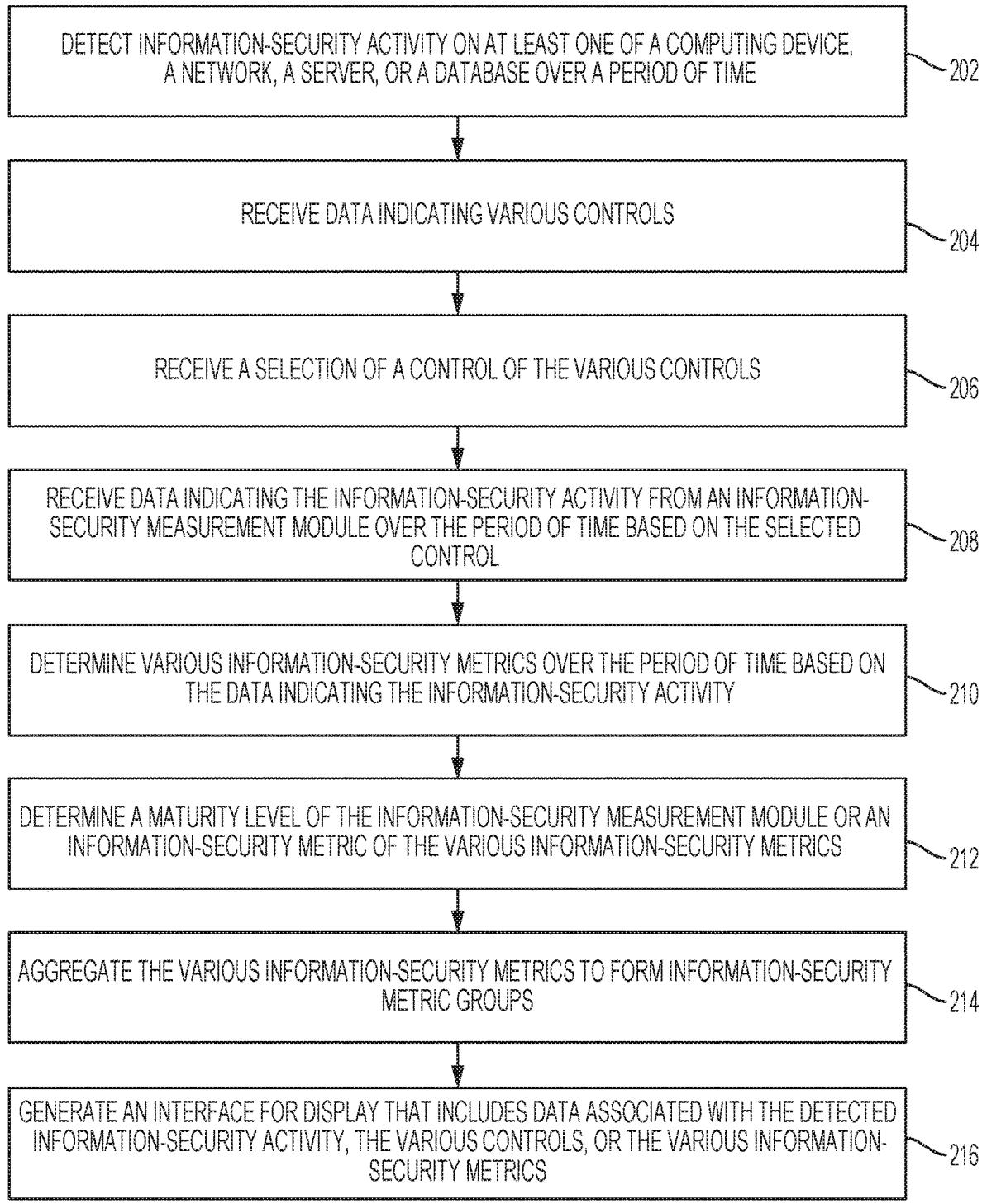
FIG. 2 is a flow chart depicting an example of a process for determining a metric based on data obtained from an information-security measurement module, aggregating the data, and outputting data to identify an exploitable weakness or risk in the information-security coverage according to some aspects.

Illustrative Example of Aggregating Data Obtained from Information-Security Measurement Modules and Outputting Data Obtained from Information-Security Modules or Metrics FIG. 2 is a flow chart depicting an example of a process for determining a metric based on data obtained from an information-security measurement module, aggregating the data, and outputting data to identify an exploitable weakness or risk in the information-security coverage. The process of FIG. 2 is described with reference to the environment 100 of FIG. 1, but other implementations are possible.

In block 202, information-security activity on a computing device 104a-c, a network 110, an information-security server 102, or a database 106 is detected over a period of time. An information-security measurement module 124a-c stored on, or executed by, the computing device 104a-c can detect the information-security activity. The computing device 104a can use the information-security measurement module 124a to detect activity on the computing device 104a, the network 110, the information-security server 102, or the database 106. Detecting activity using the information-security measurement module 124a can include detecting operations or processes performed by, or on, the computing devices 104a-c, the network 110, the information-security server 102, or the database 106. As another example, detecting activity using the information-security measurement module 124a can include detecting data communicated among the computing devices 104a-c, the information-security server 102, and the database 106 via the network 110. Detecting activity using the information-security measurement module 124a can also include detecting an attempt to gain unauthorized access to the computing device 104a, the network 110, the information-security server 102, or the database 106. For example, one or more unauthorized devices 134, 136 or unauthorized users (e.g., a hacker) outside the environment 100 may attempt to gain unauthorized access to the environment 100 (e.g., undermine the integrity, availability, or confidentiality of data on the computing devices 104a-c or on the information-security server 102) and the information-security measurement module 124a can detect the attempt. The unauthorized devices 134, 136 can include a processor 138a-b, a bus 140a-b, and a memory 142a-b, each of which can be configured in substantially the same manner as the processor 112a, the bus 114a, and the memory 116a, although they need not be. In some examples, the activity detected using the information-security measurement module 124a can be used to determine a security level of the environment 100.

In some examples, in block 202, the computing device 104a can use the information-security measurement module 124a to detect or monitor activity on the computing devices 104a-c, the network 110, the information-security server 102, or the database 106 over a period of time, such as, for example, a week, month, year, or other period of time. The computing device 104a can store data indicating the detected or monitored activity in the database 115a.

Examples of the information-security measurement module 124a include, but are not limited to, RSA® Archer Information Management System, PhishGuru™, Qualys®, ServiceNow®, Websense, SharePoint, WorkDay, etc.

In block 204, data indicating various controls is received. In some examples, the information-security server 102 includes a control module 126 that can be used to receive the data. The information-security server 102 can use the control module 126 to receive the data from another computing device or system or from user input. Each control can indicate a process or procedure for managing or monitoring information security. As an example, a control can indicate a procedure or process for monitoring a security level of communication among the computing devices 104a-c, the information-security server 102, and the database 106 via the network 110 or monitoring a security level of information stored on the computing devices 104a-c, the information-security server 102, or the database 106. As another example, each control can indicate a procedure or process for identifying or mitigating an exploitable weakness or risk of the computing devices 104a-c, the information-security server 102, the database 106, or the network 110 to access by an unauthorized user or unauthorized devices 134, 136.

In some examples, a control can be based on, or derived from, any framework or procedure for monitoring or managing information security. As an example, the National Institute of Standards and Technology's ("NIST"), International Organization for Standardization ("ISO"), and the International Electrotechnical Commission ("IEC") frameworks include various controls (e.g., policies, procedures, processes, etc.) for managing or monitoring information security. The information-security server 102 can use the control module 126 to receive data indicating a framework or protocol for monitoring or managing information security and the framework includes various controls. The control module 126 can be used to identify, select, or determine one or more controls associated with the framework based on the received data.

In block 206, a selection of a control of the various controls is received. The information-security server 102 can use the control module 126 to receive the selection of the control. For example, the information-security server 102 uses the control module 126 to receive data from another computing device or system indicating the selection of the control. In another example, the information-security server 102 uses the control module 126 to receive user input indicating the selection of the control. As an example, the control module 126 can receive a selection of a control from among various controls and the selected control can indicate whether each computing device 104a-c contains computational logic with associated vulnerabilities. In some examples, in block 206, the control module 126 can be used to receive data indicating a subset of the various controls. For example, the control module 126 can be used to receive data from another computing device or from user input indicating the subset of controls.

In block 208, data indicating the information-security activity is received from an information-security measurement module 124a-c over a period of time based on the selected control. For example, the information-security server 102 includes an information-security data sensing module 128, which can be used to receive data from information-security measurement modules 124a-c. The data received using the information-security data sensing module 128 can correspond to activity on the computing device 104a-c the network 110, the information-security server 102, or the database 106 detected by the information-security measurement module 124a-c (e.g., in block 202). In some examples, in block 208, the information-security data sensing module 128 receives or obtains a subset of the data indicating the activity detected by the information-security measurement modules 124a-c. For example, the information-security data sensing module 128 can receive data indicating the selected control (e.g., a control selected at block 206). The information-security data sensing module 128 can receive or obtain data from one or more information-security measurement modules 124a-c that can detect activity associated with the selected control. In another example, the information-security data sensing module 128 can be used to transmit a signal to the information-security measurement modules 124a-c. The signal can be based on a selected control (e.g., a control selected at block 206) and the signal can cause the information-security measurement modules 124a-c to detect activity associated with the selected control (e.g., detect activity associated with a particular procedure for managing or monitoring information security) and transmit data indicating the detected activity to the information-security data sensing module 128.

For example, the control module 126 receives a selection of a control that indicates whether each computing device 104a-c contains computational logic with associated vulnerabilities (e.g., at block 206) and the information-security data sensing module 128 receives data indicating the selected control from the control module 126. The information-security data sensing module 128 can then transmit a signal to each information-security measurement module 124a-c, which can cause the information-security measurement modules 124a-c to detect whether each computing device 104a-c contains computational logic with associated vulnerabilities. The information-security measurement modules 124a-c can then transmit the detected data to the information-security data sensing module 128.

As another example, the information-security data sensing module 128 can receive data from another computing device or user input indicating a correlation between a control and an information-security measurement module 124a-c. The correlation can indicate that a particular information-security measurement module 124a-c correlated with the control can be used to detect activity associated with the control. The information-security data sensing module 128 can then transmit a signal to the particular information-security measurement module 124a-c and obtain or receive data from the particular information-security measurement module 124a-c.

In some examples, in block 208, the information-security data sensing module 128 can receive data from an information-security measurement module 124a-c over a period of time (e.g., the period of time in block 202). The information-security data sensing module 128 can also be used to store data. For example, the information-security data sensing module 128 can cause the information-security server 102 to store at least some of the data received from the information-security measurement modules 124a-c in the database 106.

In block 210, various information-security metrics are determined over a period of time based on data indicating the information-security activity (e.g., based on the data received at block 208). The information-security server 102 can include a metric determining module 130, which can be electrically or communicatively coupled to the information-security data sensing module 128 and can receive data obtained or stored by the information-security data sensing module 128 (e.g., in block 210). The metric determining module 130 can process the data to determine or generate an information-security metric based on the data.

For example, the metric determining module 130 can determine an information-security metric that indicates a number of computing devices 104a-c that contain computational logic with associated vulnerabilities. As another example, the metric determining module 130 can determine an information-security metric by comparing the data obtained from the information-security data sensing module 128 to a metric threshold. For instance, the metric determining module 130 receives data indicating an information-security metric threshold (e.g., from another computing device or from user input) and the metric determining module 130 can compare the information-security metric threshold to the data obtained or stored by the information-security data sensing module 128. As an example, the metric determining module 130 receives an information-security metric threshold indicating a tolerable number of computing devices 104a-c containing computational logic with associated vulnerabilities. The metric determining module 130 can then compare the information-security metric threshold to the number of computing devices 104a-c containing computational logic with associated vulnerabilities and determine an information-security metric based on the comparison. The information-security metric can indicate a percentage of the computing devices 104a-c in compliance with a selected control (e.g., a control selected in block 206). In some examples, a determined information-security metric can indicate a risk or exploitable weakness in information-security coverage in the environment 100.

The metric determining module 130 can also determine a metric threshold based on data obtained from the information-security data sensing module 128. For example, the information-security data sensing module 128 obtains data from the information-security measurement modules 124a-c over a period of time. The metric determining module 130 can obtain the data from the information-security data sensing module 128 and determine a metric threshold based on the accumulated data.

In some examples, in block 210, the metric determining module 130 can obtain or receive data obtained or stored by the information-security data sensing module 128 over a period of time (e.g., the period of time in block 202). The metric determining module 130 can then determine or generate various metrics over the period of time that can indicate an overall state of information-security coverage in the environment 100 over the period of time. As an example, the metric determining module 130 can determine a metric that indicates a number of computing devices 104a-c containing computational logic with associated vulnerabilities over a period of one year. The metric can indicate an overall state of information-security coverage in the environment 100 over the one year period. For example, the metric can indicate that the environment 100 has a low or weak state of information-security coverage if the number of computing devices 104a-c in the environment containing computational logic with associated vulnerabilities is above a threshold value over the one year period, which can indicate that there is a high risk or exploitable weakness in information-security coverage in the environment 100.

In block 212, a maturity level of an information-security measurement module 124a-c (e.g., the information-security measurement module 124a-c of block 208) or a maturity level of an information-security metric of the various information-security measurement metrics is determined. The maturity level of the information-security measurement module 124a-c can indicate a reliability of the information-security measurement module 124a-c for providing data that can be used to determine metrics or a reliability of the data provided by the information-security measurement module 124a-c for determining metrics. The maturity level of a metric can indicate a reliability or strength of the metric for identifying an exploitable weakness or risk in information-security coverage in the environment 100.

For example, the metric determining module 130 receives or obtains data indicating a quality of data provided by the information-security measurement module 124a for determining a metric and the metric determining module 130 determines a maturity level of the information-security measurement module 124a based on the data. As an example, the metric determining module 130 can determine that the information-security measurement module 124a has a high maturity level if the data received or obtained by the metric determining module 130 indicates that the data provided by the information-security measurement module 124*a* is of a high quality (e.g., data indicating that the data is reliable for determining metrics).

In some examples, in block 212, the metric determining module 130 can also be used to receive data indicating a maturity level of an information-security metric (e.g., from another computing device or from user input). The maturity level of an information-security metric can depend on various factors including, for example, a number or type of information-security measurement modules 124*a-c* providing data that can be used to determine the metric, a number of the computing devices 104*a-c*, or any other factor. As an example, the metric determining module 130 determines an information-security metric that indicates that none of the computing devices 104*a-c* complies with a particular control, which may indicate a risk or exploitable weakness of information-security coverage in the environment 100. In this example, one or more of the information-security measurement modules 124*a-c* may not be detecting activity or providing data associated with the particular control, which causes the information-security metric associated with the control to have a low maturity level. The low maturity level of the information-security metric can indicate that the information-security metric is not sufficiently reliable for identifying an exploitable weakness or risk in information-security coverage in the environment 100.

The metric determining module 130 can determine a maturity level of an information-security metric. For example, the metric determining module 130 can receive data indicating one or more factors associated with an information-security metric, which can be used to determine the maturity level of the metric. Examples of such factors include, but are not limited to, a process for monitoring information security risk associated with the information-security metric, a control associated with the information-security metric, an availability of data for determining the information-security metric (e.g., whether an information-security measurement module 124*a-c* is providing data for determining the information-security metric), a method or process for delivering data for determining the information-security metric (e.g., whether the information-security measurement module 124*a-c* is automatically providing data for determining the information-security metric), a quality of the data obtained or received by the server for determining the information-security metric (e.g., a maturity level of an information-security measurement module 124*a-c* providing data for determining the information-security metric), etc. The metric determining module 130 can determine a maturity level of the information-security metric based on the data indicating a factor associated with the metric.

As an example, the metric determining module 130 receives or obtains data indicating an availability of data for determining an information-security metric, such as, for example, data indicating that none of the information-security measurement modules 124*a-c* in the environment 100 can detect whether computing devices 104*a-c* in the environment 100 contain computational logic with associated vulnerabilities. The metric determining module 130 can then determine that a particular information-security metric (e.g., a number of computing devices 104*a-c* in the environment 100 containing computational logic with associated vulnerabilities) has a low maturity level in response to determining that the data for determining the information-security metric is sparse or unavailable.

In some examples, in block 212, the metric determining module 130 can also determine a weight value associated with an information-security metric. In another example, the metric determining module 130 is used to obtain data indicating a weight value associated with an information-security metric (e.g., from another computing device or from user input). A weight value associated with an information-security metric can indicate an importance of the metric for protecting information in the environment 100 (e.g., protecting information or data exchanged among the computing devices 104*a-c*, the information-security server 102, and the database 106 via the network 110 or protecting information or data on the computing devices 104*a-c*, the information-security server 102, or the database 106). In some examples, the metric determining module 130 determines a weight value associated with the information-security metric based on the maturity level of the information-security metric. For example, the metric determining module 130 can determine that an information-security metric that has a low maturity level also has a low weight value.

In block 214, the various information-security metrics are aggregated to form information-security metric groups. For example, the information-security server 102 includes an aggregating module 132, which can be electrically or communicatively coupled to the metric determining module 130. The aggregating module 132 can receive or obtain data from the metric determining module 130 and aggregates data obtained from the metric determining module 130. Aggregating the data can include grouping the data based on a similarity. For example, the aggregating module 132 can compare data obtained from an information-security measurement module 124*a* and data obtained from an information-security measurement module 124*b* and aggregate the data (e.g., group the data together) based on a similarity of the data (e.g., based on the data being associated with the same control or similar controls). As another example, the aggregating module 132 determines a similarity between information-security metrics determined by the metric determining module 130 (e.g., at block 210) and aggregate the information-security metrics based on the similarity. For instance, the aggregating module 132 aggregates information-security metrics associated with the same control (e.g., aggregate information-security metrics associated with the control selected at block 206) or associated with similar controls.

In some examples, in block 214, the aggregating module 132 receives or obtains data from the information-security data sensing module 120 or the metric determining module 130 over a period of time (e.g., the period of time in block 202) and aggregates the data obtained or received over the period of time.

In block 216, an interface for display that includes data associated with the detected information-security activity, the various controls, or the various information-security metrics is generated. In some examples, the information-security server 102 can transmit data indicating the detected information-security activity, the various controls, or the various information-security metrics to the computing devices 104*a-c* and the computing devices 104*a-c* can generate the interface and output the interface via a display device 120*a-c*.

The computing devices 104*a-c* can generate one or more interactive user interfaces for outputting or displaying data obtained or received from the information-security server 102. An interactive user interface can align a framework with corresponding controls, metrics, and information-security measurement modules 124*a-c*, which can allow the user to identify an exploitable weakness or risk in information-security coverage (e.g., determine that the environment 100 does not comply with one or more controls) and modify the information-security measurement module 124*a-c*, the computing devices 104a-c, or the network 110 such that the environment 100 is in compliance with the framework or the one or more controls.

The computing devices 104a-c can also generate and output an interface that indicates an overall state of information-security coverage in the environment 100 (e.g., the overall state of information-security coverage over a period of time).

Figure 3:
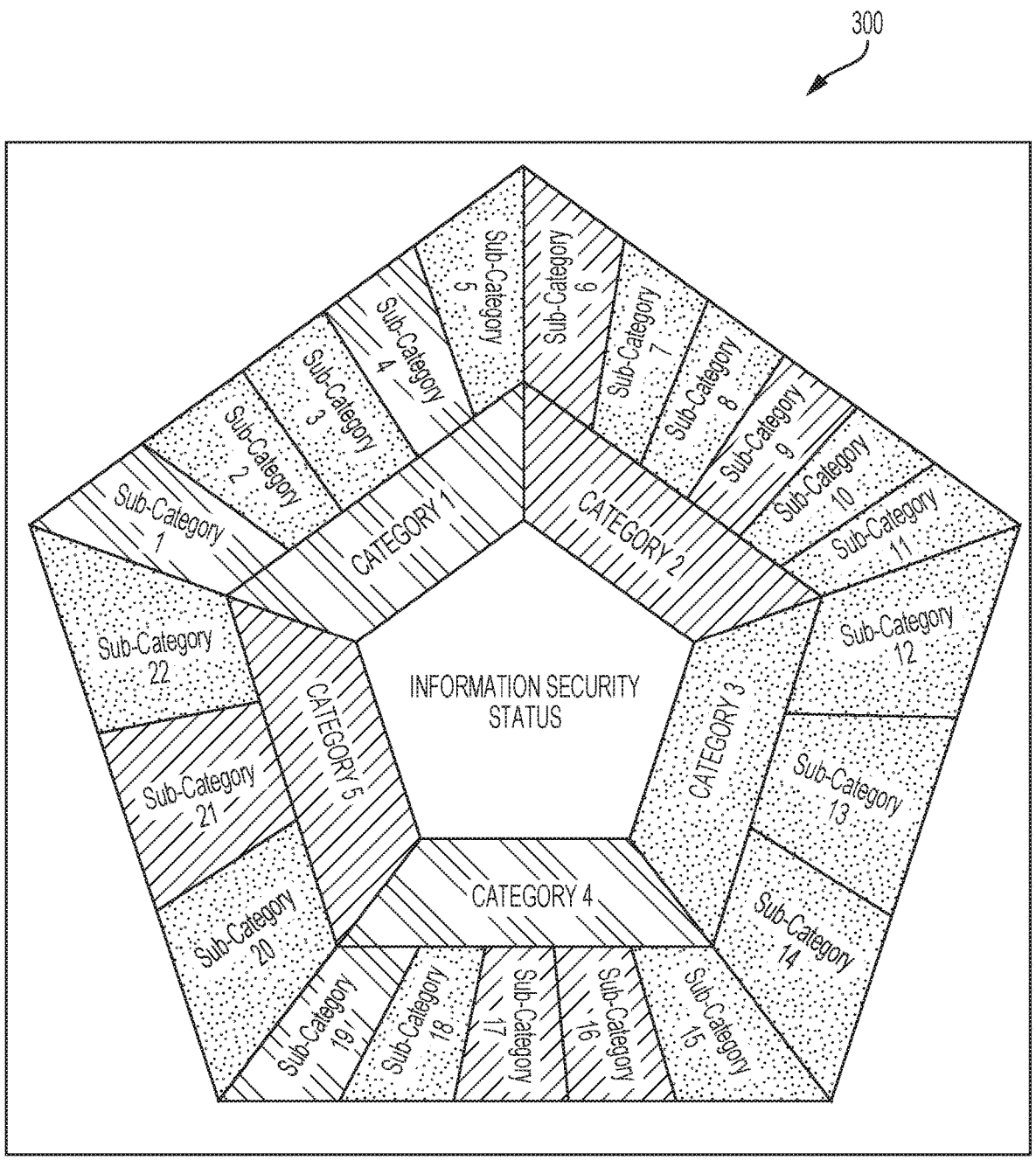
FIG. 3 is an example of a user interface that can be generated for monitoring an information-security status to identify an exploitable weakness or risk in the information-security coverage according to some aspects.

For example, FIG. 3 is an example of a user interface 300 that can be generated for monitoring an information-security status to identify an exploitable weakness or risk in the information-security coverage according to some aspects.

In the example depicted in FIG. 3, the computing devices 104a-c can generate the user interface 300 and the user interface 300 can correspond to a framework for monitoring or managing information security. The user interface 300 can indicate various categories or subcategories of the framework, which can each correspond to activities or functions for protecting or monitoring information-security. In this example, the user interface 300 includes five categories and various subcategories associated with each category. An example of a category can included, but is not limited to, identifying organizational needs or resources to manage or monitor information-security risk to systems, assets, data, etc. in an environment (e.g., in the environment 100 of FIG. 1), protecting information in the environment (e.g., developing methods and processes for protecting information in the environment 100 of FIG. 1), detecting a risk to the security of the information (e.g., developing methods and processes for detecting the risk), responding to the detected risk (e.g., developing processes to take action regarding a detected risk), and recovering from a threat posed by the risk, etc.

In some examples, each sub-category can be a subdivision of a category. An example of a sub-category can include, but is not limited to, asset management, access control, detection processes, etc. In some examples, each activity, function, or category can be based on, or correspond to, a control associated with a framework. In some examples, the user interface 300 can be based on the NIST, ISO, IEC or other frameworks.

The user interface 300 can include one or more selectable icons, buttons, portions, etc. that can be used to receive user input (e.g., by a user clicking on or interacting with a selectable icon, button, or portion). For example, the user interface 300 can include a selectable icon or button that corresponds to an activity, function, category, or sub-category included in the user interface 300. The computing device 104a-c can generate another user interface in response to user input indicating a selection of the selectable icon, button, or portion. For example, FIG. 4 is an example of another user interface 400 that can be generated by the computing devices 104a-c for monitoring information-security coverage to identify an exploitable weakness or risk in the information-security coverage.

The computing devices 104a-c generate the user interface 400 in response to user input indicating a selection of a selectable icon or button corresponding to a category or sub-category in the user interface 300 of FIG. 3 (e.g., in response to the selection of a selectable icon corresponding to sub-category 11 of the user interface 300 of FIG. 3). The user interface 400 includes data indicating an information-security metric associated with the selected sub-category. The user interface 400 can include data indicating an information-security metric of an information-security metric group (e.g., an information-security metric of an information-security metric group formed at block 214). As an example, the user interface 400 includes data indicating various information-security metrics associated with sub-category 11 such as, for example, a number of information security audit issues greater than 30 days past a committed target date or a number of high risk information security audit issues not remediated prior to a current target date. The user interface 400 can also include a status or risk level associated with each activity, function, category, sub-category, or control. For example, the user interface 400 can indicate that an activity, function, category, sub-category, or control is associated with a risk to the security of information in an environment (e.g., information in the environment 100 of FIG. 1). In the example shown in FIG. 4, the user interface 400 indicates that sub-category 11 and the various metrics associated with sub-category 11 (e.g., the number of information security audit issues greater than 30 days past a committed target date or the number of high risk information security audit issues not remediated prior to a current target date) are associated with a low risk or threat to the security of information in the environment.

Figure 5:
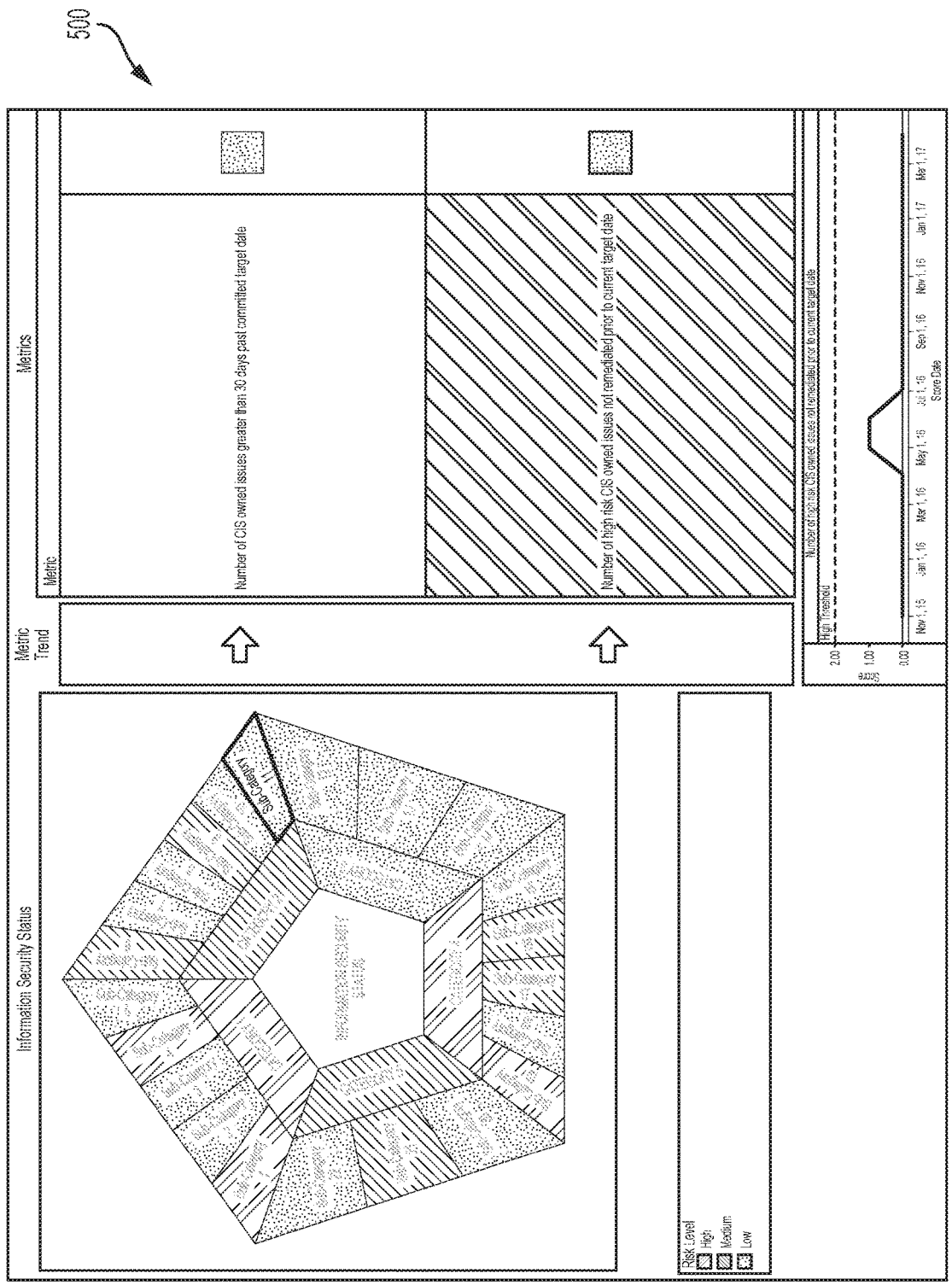
FIG. 5 is an example of another user interface that can be generated in response to user input indicating a selection of a portion of the user interface of FIG. 4 for providing additional data for monitoring information-security coverage to identify an exploitable weakness or risk in the information-security coverage according to some aspects.

The user interface 400 can include one or more selectable icons, buttons, portions, etc. that can be used to receive user input (e.g., by a user clicking on or interacting with a selectable icon, button, or portion). For example, the user interface 400 includes a selectable icon or button that corresponds to an activity, function, category, sub-category, or metric included in the user interface 400. The computing devices 104a-c can generate another user interface in response to user input indicating a selection of the selectable icon, button, or portion. For example, FIG. 5 is an example of another user interface 500 that can be generated by the computing devices 104a-c for monitoring information-security coverage to identify an exploitable weakness or risk in the information-security coverage.

Figure 4:
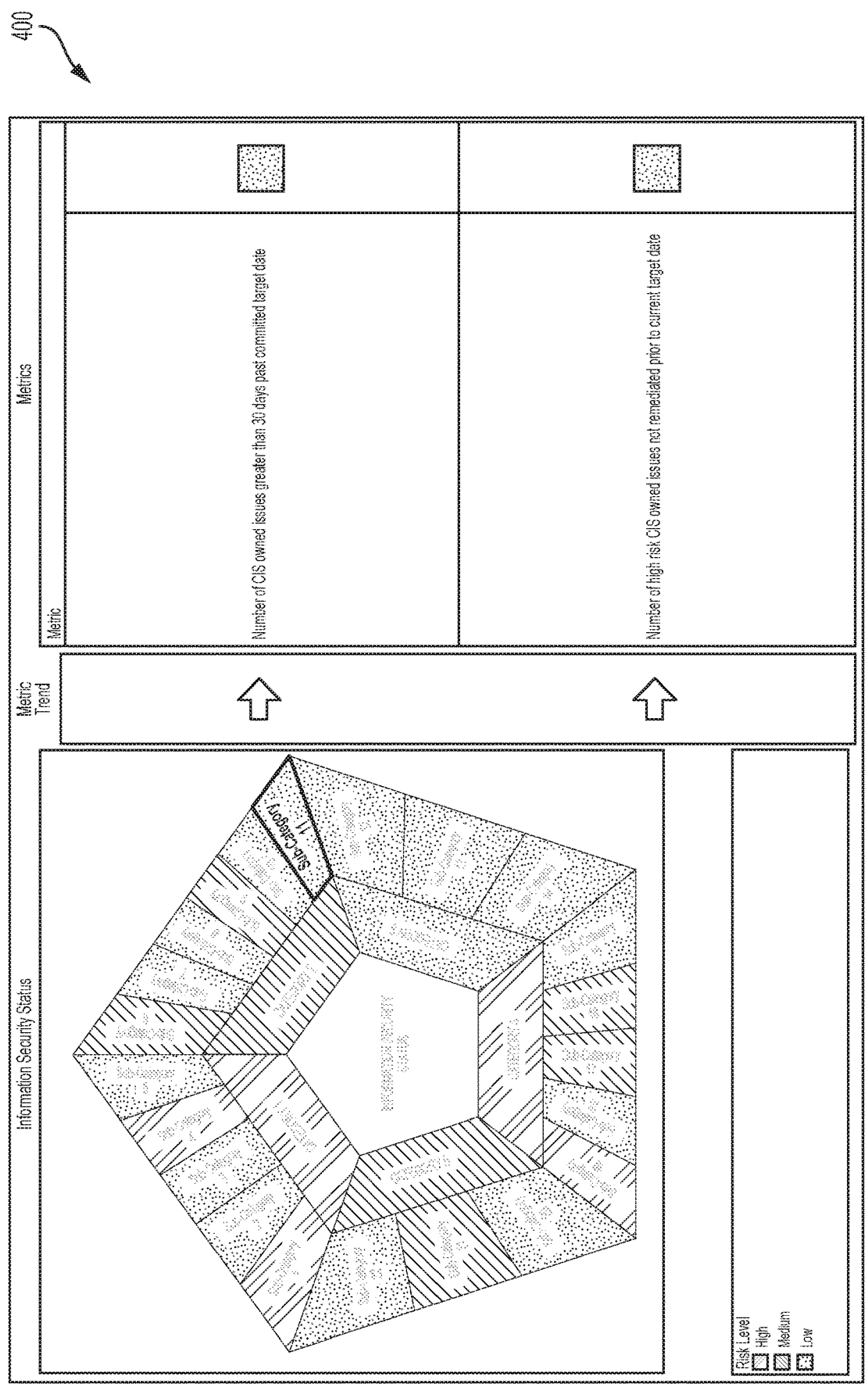
FIG. 4 is an example of another user interface that can be generated in response to user input indicating a selection of a portion of the user interface of FIG. 3 for providing additional data for monitoring information-security coverage to identify an exploitable weakness or risk in the information-security coverage according to some aspects.

The computing devices 104a-c can generate the user interface 500 in response to user input indicating a selection of a selectable icon, button, etc. corresponding to an information-security metric in the user interface 400 of FIG. 4 (e.g., in response to the selection of a selectable icon corresponding to a number of high risk issues not remediated prior to a target date of FIG. 4). The user interface 500 includes data associated with the metric, such as, for example, one or more graphs, charts, plots, tables, etc. that include data associated with a selected metric.

Figure 6:
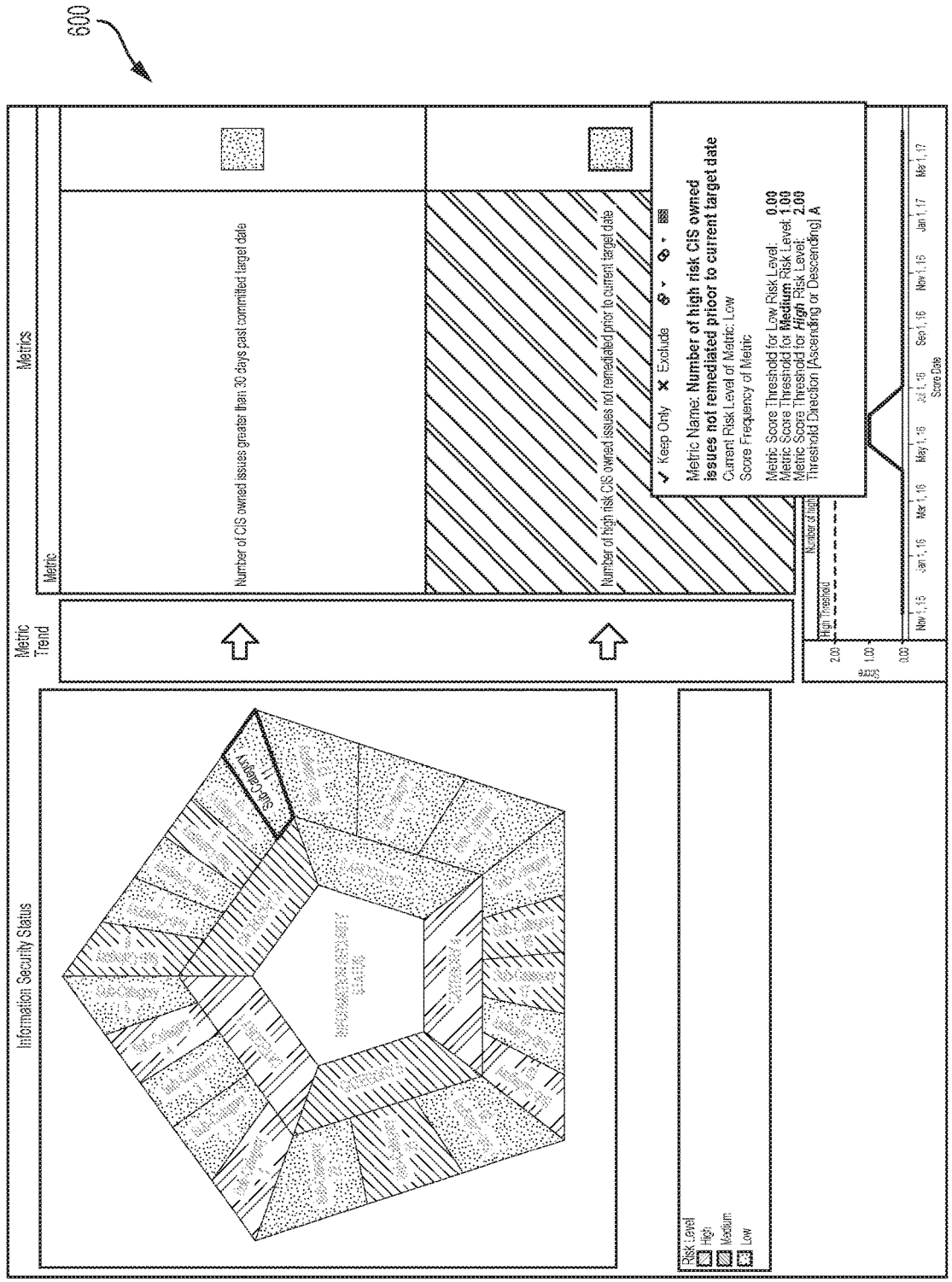
FIG. 6 is an example of another user interface that can be generated in response to user input indicating a selection of a portion of the user interface of FIG. 5 for providing additional data for monitoring information-security coverage to identify an exploitable weakness or risk in the information-security coverage according to some aspects.

FIG. 6 is an example of another user interface 600 that can be generated by the computing devices 104a-c for monitoring information-security coverage to identify an exploitable weakness or risk in the information-security coverage.

Returning to FIG. 2, in some examples, in block 216, the computing devices 104a-c generate an interface that includes data associated with detected information-security activity, various controls, or various information-security metrics. For instance, the computing device 104a can obtain aggregated data from the aggregating module 132 and output the data for identifying an exploitable weakness in information-security coverage, which can improve the security of information in the environment 100. For example, the data displayed can indicate that a control is not associated with an information-security measurement module 124a-c (e.g., the information-security measurement modules 124a-c are not detecting activity or providing data associated with the control), which can indicate a risk or exploitable weakness in the information-security coverage. As another example, the data displayed can indicate that the control module 126 did not obtain or receive data indicating one or more desired controls, which can indicate an exploitable weakness in the information-security coverage. In some examples, one or more of the information-security measurement modules 124a-c, metrics, or controls can be modified based on the identified exploitable weakness or risk. As another example, the computing devices 104a-c can output the aggregated data for selecting a process for mitigating or eliminating the identified exploitable weakness in information security risk coverage.

Figure 7:
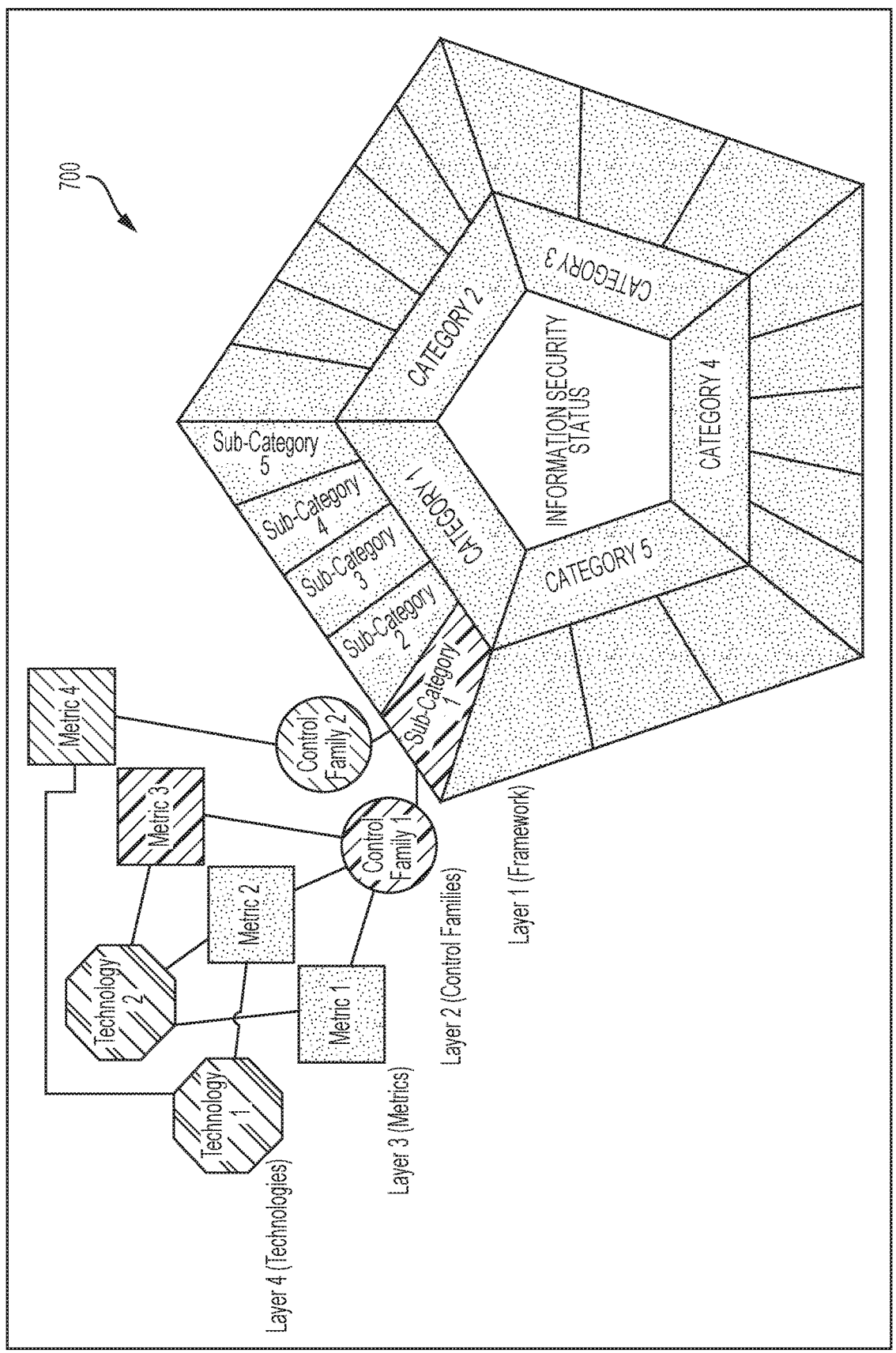
FIG. 7 is a flow chart depicting an example of a process for outputting data obtained from an information-security measurement module that can be used for monitoring information-security coverage to identify an exploitable weakness or risk in the information-security coverage in which categories of a framework are aligned with corresponding controls, metrics, and information-security measurement modules according to some aspects.

The computing devices 104a-c can also generate one or more interactive user interfaces for outputting or displaying data obtained or received from the information-security server 102. For example, FIG. 7 is a flow chart depicting an example of a process for outputting data obtained from an information-security measurement module that can be used for monitoring information-security coverage to identify an exploitable weakness or risk in the information-security coverage according to some aspects. The user interface 700 can be an interactive user interface in which categories of a framework (e.g., the NIST, ISO, ICE or other framework) are aligned with various subcategories of the framework and corresponding controls, metrics, and information-security measurement modules (also referred to as technologies), which can allow the user to identify a gap or risk in information-security coverage (e.g., determine that the environment 100 does not comply with one or more controls) and modify the information-security measurement module 124a-c, the computing devices 104a-c, or the network 110 such that the environment 100 is in compliance with the framework or the one or more controls.

Thus, in some instances, the information-security server 102 and the computing devices 104a-c can be used to address various information-security related issues. For example, as described above, one or more unauthorized users or unauthorized devices 134, 136 may attempt to gain unauthorized access to the computing devices 104a-c, the information-security server 102, or any device in the environment 100. The information-security server 102 or the computing devices 104a-c generate one or more user interfaces (e.g., the user interfaces of FIGS. 5-8) based on information-security data obtained from information-security measurement modules 124a-c and the data indicates an exploitable weakness or risk in information-security coverage of the environment 100. A user can interact with the interfaces and then modify the computing devices 102a, the information security server, or any device of the environment 100 prevent unauthorized access to the computing devices 104a-c, the information-security server 102, or other device to maintain the security of environment 100. Preventing such unauthorized access to the computing devices 104a-c, the information-security server 102, or any device in the environment 100 can enhance a performance of the computing devices 104a-c, the information-security server 102, or the other device (e.g., by preventing an unauthorized user or device from tampering with a function or performance of the device or server).

Figure 8:
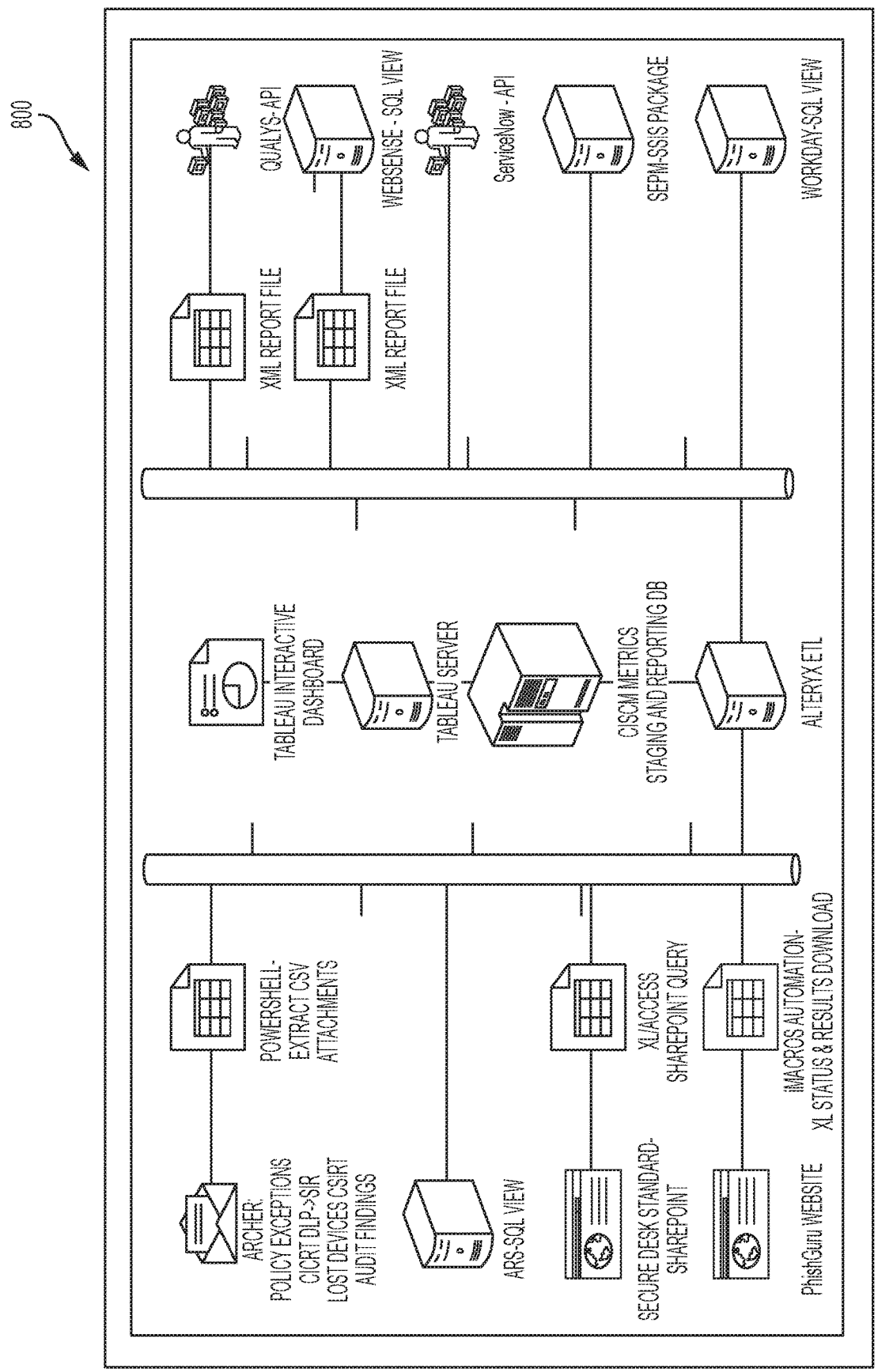
FIG. 8 is an image depicting an example of an environment in which an information-security server for monitoring information-security coverage to identify an exploitable weakness or risk in the information-security coverage can operate according to some aspects.

FIG. 8 is an image depicting an example of an environment 800 in which an information-security server for monitoring information-security coverage to identify an exploitable weakness or risk in the information-security coverage can operate according to some aspects. In the example depicted in FIG. 8, various information-security measurement modules are used to detect activity on a computing device, network, server, database, or any other device in the environment 800. The information-security measurement modules can include, but are not limited to, RSA® Archer Information Management System, PhishGuru™, Qualys®, ServiceNow®, Websense, SharePoint, WorkDay, etc. The various information-security measurement modules can provide data to the server (e.g., the information-security server 102 of FIG. 1). The server can be used to identify an exploitable weakness or risk in the information-security coverage by: i) aggregating data obtained from the various information-security measurement modules or aggregating the metrics determined from the obtained data; ii) determining a reliability level or strength of a determined metric; and iii) outputting the data obtained from the various information-security measurement modules, the aggregated data, or the metrics, as described above.

Figures 1, 9:
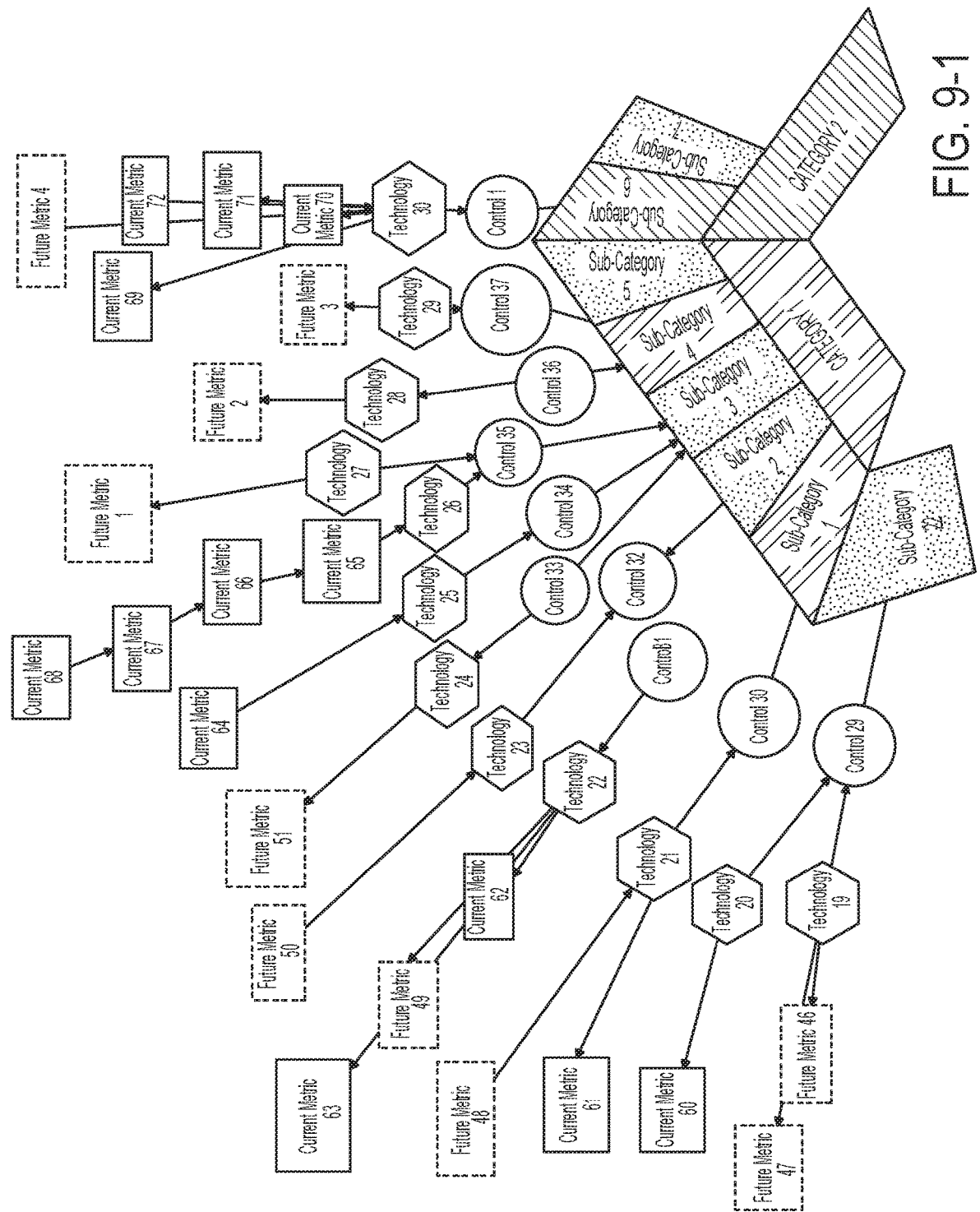
Figures 2, 9:
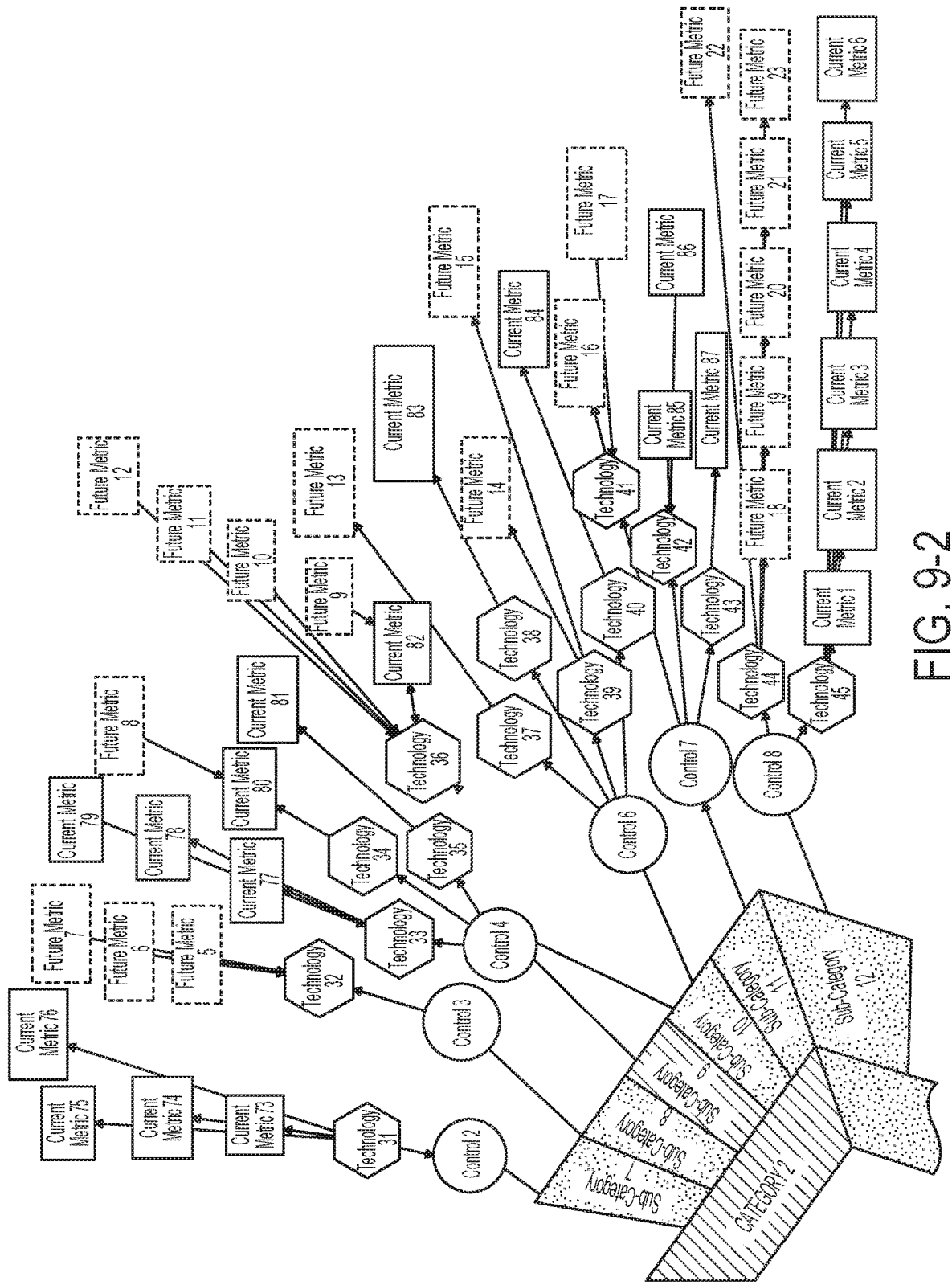
Figures 3, 9:
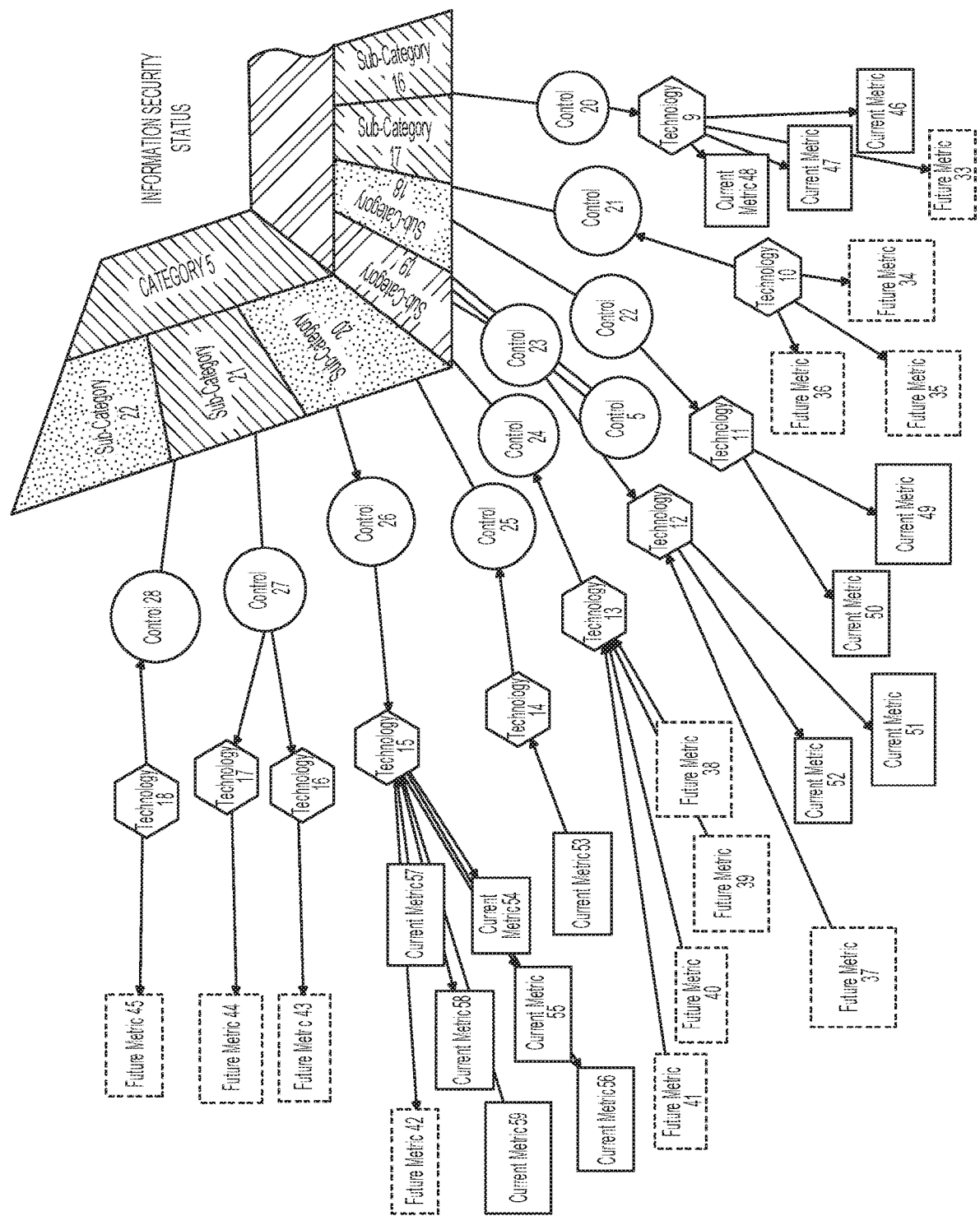
Figures 4, 9:
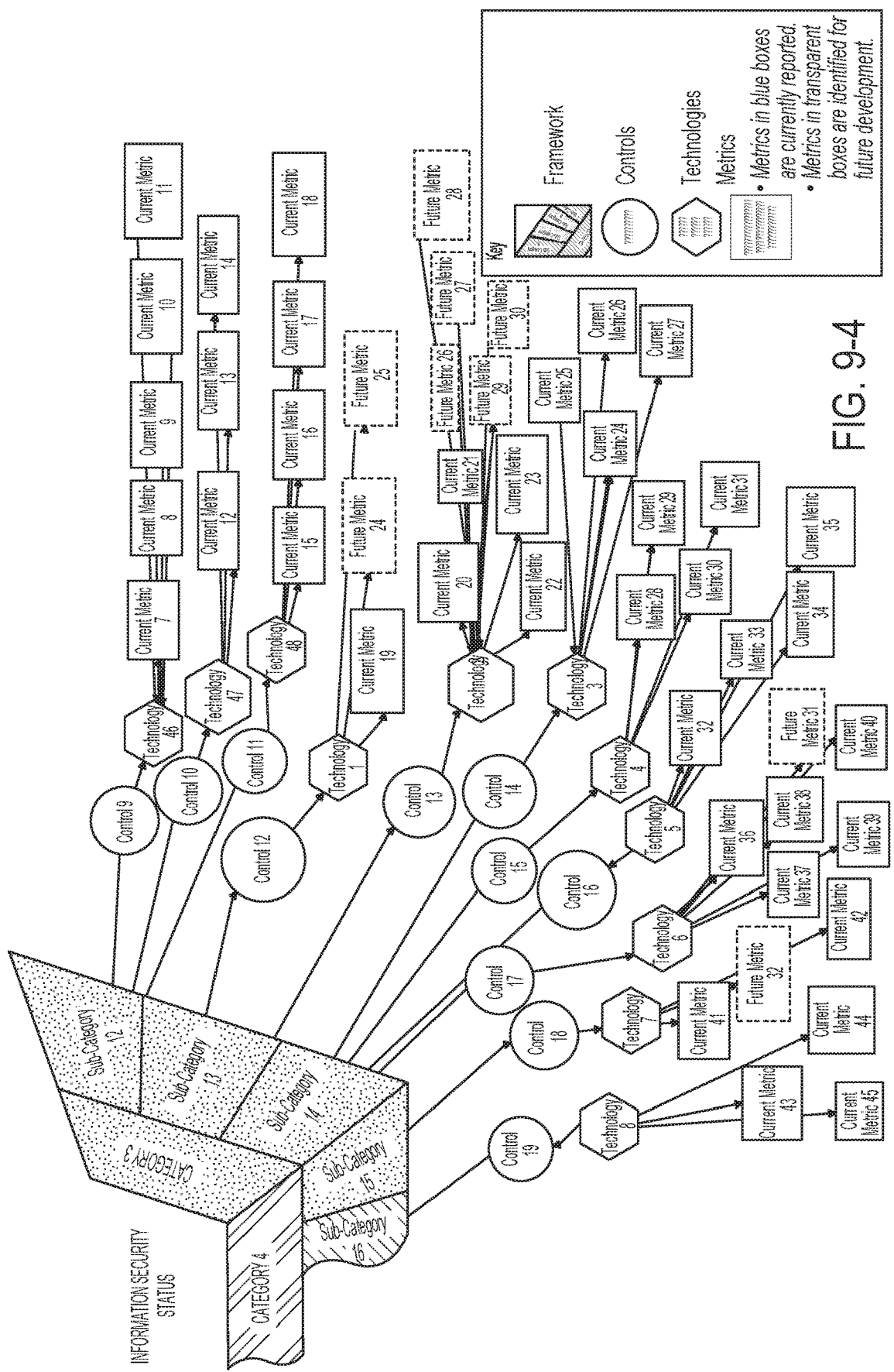

FIGS. 9-1 to 9-4 together form a graph depicting an example of relationships between various components of an information-security environment that can be used to monitor information-security coverage according to some aspects. FIG. 9-1 shows an upper, left-hand side of the graph, FIG. 9-2 shows an upper, right-hand side of the graph, FIG. 9-3 shows a lower, left-hand side of the graph, and FIG. 9-4 shows a lower, right-hand side of the graph. FIGS. 9-1 to 9-4 show various relationships between information-security measurement modules or technologies, metrics, controls, and frameworks that can be used to monitor information-security coverage. In this example, the various controls are based on the NIST Framework for improving critical infrastructure cybersecurity. In this example, one or more metrics are being reported while one or more metrics are not being reported. In some examples, a metric is being reported if an information-security measurement module (e.g., the information-security measurement modules 124a-c of FIG. 1) is obtaining or providing data for determining the metric. In some examples, if no information-security measurement module is detecting and providing data for determining the metric, then the metric is not being reported. In this manner, unreported metrics can be identified and information-security coverage can be improved (e.g., by adding or using an information-security measurement module to provide data for determining the unreported metric).

Illustrative Example of Using an Information Security Server to Identify an Exploitable Weakness or Risk in Information-Security Coverage In one illustrative example, the information-security server 102 can obtain or receive data from the information-security measurement modules 124a-c over a period of time (e.g., a week, month, year, etc.). The information-security server 102 can determine various metrics and aggregate the metrics as described above. Subsequently, a user of a computing device 104a-c can provide user input indicating a query or request for data about information-security coverage in the environment 100. In response to receiving the user input, the computing device 104a-c can obtain or receive data from the information-security server 102. The data can include data about one or more frameworks or controls obtained using the control module 126, a category or subcategory of the framework, metrics determined using the metric determining module 130 over the period of time, data indicating information-security measurement modules 124a-c, a maturity level of a metric or information-security measurement module 124a-c over the period of time, or any other data. The computing device 104a-c can obtain or receive the data from the server 102 and generate an interactive user interface that graphically displays the data obtained from the server 102 and the user can interact with the user interface (e.g., by providing user input) to obtain additional data about the frameworks, controls, categories or subcategories of the framework, the metrics, the information-security measurement modules 124*a-c*, etc. In this example, the user interface graphically aligns the framework with the controls, metrics, and information-security measurement modules, such as, for example, as depicted in FIG. 7. In this manner, the information-security server 102 can provide the user with data about the overall state of information-security coverage in the environment 100 over the period of time. The user can identify an exploitable weakness or risk in the information-security coverage based on the data and modify one or more components of the environment, the framework, the control, or any other component or feature of the environment in response to identifying the risk. For example, and with reference to FIG. 7, the user interface 700 can allow the user to determine or identify a gap or risk in information-security coverage such as, for example, that there is no information-security measurement module 124*a-c* (or technology) associated with a particular category or control of the framework (e.g., that none of the information-security measurement modules 124*a-c* are configured to provide data such that the environment 100 is in compliance with the category or control). The user can then modify the environment 100 by adding an information-security measurement module 124*a-c* that can provide data such that the environment 100 will comply with the control or category, which can improve the security of information in the environment 100.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
   receiving, by a processing device, a data set associated with a framework for monitoring or managing information security, wherein the data set includes data about a plurality of controls indicating processes for monitoring a security level of an information-security system or identifying an exploitable weakness of the information-security system;
   receiving, by the processing device, a selection of a control of the plurality of controls;
   receiving, by the processing device, detected information-security data, the detected information-security data indicating activity on a computing device, a network, a server, or a database over a period of time;
   determining, by the processing device, a plurality of information-security metrics based on the detected information-security data, wherein an information-security metric is usable for monitoring the security level of the information-security system or identifying the exploitable weakness of the information-security system over the period of time;
   aggregating, by the processing device, the plurality of information-security metrics to form a plurality of information-security metric groups; and
   generating, by the processing device, an interface for display that includes data associated with the detected information-security data, the plurality of controls, or the plurality of information-security metrics for determining one or more processes for improving the security level of the information-security system or mitigating the identified exploitable weakness of the information-security system.

2. The method of claim 1, wherein aggregating the plurality of information-security metrics to form the plurality of information-security metric groups comprises:
   comparing, by the processing device, a first information-security metric and a second information-security metric to determine a similarity between the first information-security metric and the second information-security metric, the similarity indicating that the first information-security metric and the second information-security metric are associated with a control of the plurality of controls; and
   grouping, by the processing device, the first information-security metric and the second information-security metric to form a first information-security metric group based on the similarity.

3. The method of claim 2, further comprising:
   displaying, by the processing device, the control associated with the first information-security metric and the second information-security metric, wherein the interface comprises a user selectable portion associated with the control;
   receiving, by the processing device, a selection of the user selectable portion; and
   displaying, by the processing device, the first information-security metric or the second information-security metric in response to receiving the selection of the user selectable portion.

4. The method of claim 1, wherein the detected information-security data comprises data indicating whether the computing device, the network, the server, or the database contains computational logic with an associated vulnerability.

5. The method of claim 1, wherein determining the plurality of information-security metrics comprises:
   receiving, by the processing device, detected information-security data comprising data indicating a number of computing devices in the information-security system associated with a vulnerability;
   receiving, by the processing device, data indicating a tolerable number of computing devices in the information-security system associated with vulnerabilities; and
   determining, by the processing device, an information-security metric by comparing the number of computing devices associated with a vulnerability and the tolerable number of computing devices in the information-security system associated with vulnerabilities, wherein the information-security metric indicates a percentage of the computing devices in compliance with the selected control.

6. The method of claim 1, further comprising:
   determining, by the processing device, a maturity level of an information-security metric of the plurality of information-security metrics by:
   obtaining data indicating a quality of the detected information-security data; and
   determining the maturity level of the information-security metric based on the quality of the detected information-security data, wherein the maturity level of the information-security metric indicates a reliability of the information-security metric for monitoring the security level of the information-security system or identifying the exploitable weakness of the information-security system.

7. The method of claim 6, further comprising:
   determining, by the processing device, the maturity level of the information-security metric based on at least one of the selected control of the plurality of controls, data indicating an availability of data for determining the information-security metric, or a method for delivering the data for determining the information-security metric.

8. The method of claim 1, further comprising:
determining, by the processing device, an importance of the information-security metric for monitoring the security level of the information-security system or identifying the exploitable weakness of the information-security system by:
obtaining data indicating a weight value associated with the information-security metric; and
determining the importance of the information-security metric for monitoring the security level of the information-security system or identifying the exploitable weakness of the information-security system based on the weight value.

9. The method of claim 1, further comprising:
receiving, by the processing device, the detected information-security data from the computing device;
determining, by the processing device, a maturity level of the computing device for providing the detected information-security data by:
obtaining data indicating a quality of the computing device for providing the detected information-security data; and
determining the maturity level of the of the computing device based on the quality of the computing device for providing the detected information-security data, wherein the maturity level of the computing device indicates a reliability of the computing device for detecting information-security data for monitoring the security level of the information-security system or identifying the exploitable weakness of the information-security system.

10. The method of claim 1, further comprising:
aggregating, by the processing device, the detected information-security data over the period of time; and
generating, by the processing device, the interface for display that includes data associated with the aggregated detected information-security data for monitoring the security level of the information-security system or identifying the exploitable weakness of the information-security system.

11. A system comprising:
a processing device; and
a non-transitory computer-readable medium communicatively coupled to the processing device, wherein the processing device is configured to perform operations comprising:
receiving a data set associated with a framework for monitoring or managing information security, wherein the data set indicates a plurality of controls that are available for monitoring a security level of an information-security system or identifying an exploitable weakness of the information-security system;
receiving a selection of a control of the plurality of controls;
receiving detected information-security data corresponding to the selected control, the detected information-security data indicating activity on a computing device, a network, a server, or a database over a period of time;
determining a plurality of information-security metrics based on the detected information-security data, wherein an information-security metric is usable for monitoring the security level of the information-security system or identifying the exploitable weakness of the information-security system over the period of time;
aggregating the plurality of information-security metrics to form a plurality of information-security metric groups; and
generating an interface for display that includes the detected information-security data, the plurality of controls, or the plurality of information-security metrics.

12. The system of claim 11, wherein the processing device is further configured to aggregate the plurality of information-security metrics to form the plurality of information-security metric groups by:
comparing a first information-security metric and a second information-security metric to determine a similarity between the first information-security metric and the second information-security metric, the similarity indicating that the first information-security metric and the second information-security metric are associated with a control of the plurality of controls; and
grouping the first information-security metric and the second information-security metric to form a first information-security metric group based on the similarity.

13. The system of claim 12, wherein the processing device is further configured to:
display the control associated with the first information-security metric and the second information-security metric, wherein the interface comprises a user selectable portion associated with the control;
receive a selection of the user selectable portion; and
display the first information-security metric or the second information-security metric in response to receiving the selection of the user selectable portion.

14. The system of claim 11, wherein the detected information-security data comprises data indicating whether the computing device, the network, the server, or the database contains computational logic with an associated vulnerability.

15. The system of claim 11, wherein the processing device is further configured to determine the plurality of information-security metrics by:
receiving detected information-security data comprising data indicating a number of computing devices in the information-security system associated with a vulnerability;
receiving data indicating a tolerable number of computing devices in the information-security system associated with vulnerabilities; and
determining an information-security metric by comparing the number of computing devices associated with a vulnerability and the tolerable number of computing devices in the information-security system associated with vulnerabilities, wherein the information-security metric indicates a percentage of the computing devices in compliance with the selected control.

16. The system of claim 11, wherein the processing device is further configured to:
determine a maturity level of an information-security metric of the plurality of information-security metrics by:
obtaining data indicating a quality of the detected information-security data; and
determining the maturity level of the information-security metric based on the quality of the detected information-security data, wherein the maturity level of the information-security metric indicates a reliability of the information-security metric for monitoring the security level of the information-security system or identifying the exploitable weakness of the information-security system.

17. The system of claim 16, wherein the processing device is further configured to:
  determine the maturity level of the information-security metric based on at least one of the selected control of the plurality of controls, data indicating an availability of data for determining the information-security metric, or a method for delivering the data for determining the information-security metric.

18. The system of claim 11, wherein the processing device is further configured to:
  determine an importance of the information-security metric for monitoring the security level of the information-security system or identifying the exploitable weakness of the information-security system by:
    obtaining data indicating a weight value associated with the information-security metric; and
    determining the importance of the information-security metric for monitoring the security level of the information-security system or identifying the exploitable weakness of the information-security system based on the weight value.

19. The system of claim 11, wherein the processing device is further configured to:
  receive the detected information-security data from the computing device;
  determine a maturity level of the computing device for providing the detected information-security data by:
    obtaining data indicating a quality of the computing device for providing the detected information-security data; and
    determining the maturity level of the of the computing device based on the quality of the computing device for providing the detected information-security data, wherein the maturity level of the computing device indicates a reliability of the computing device for detecting information-security data for monitoring the security level of the information-security system or identifying the exploitable weakness of the information-security system.

20. A non-transitory computer-readable medium comprising program code that is executable by a processing device for causing the processing device to perform operations including:
  receiving information-security data indicating information-security activity detected in a computing environment over a timespan by a plurality of information-security measurement modules;
  determining a plurality of information-security metrics based on the detected information-security data, wherein at least one information-security metric of the plurality of information-security metrics is configured to indicate a security risk or an exploitable weakness in the computing environment; and
  generating an interactive user interface for display that includes the plurality of information-security metrics categorized into a plurality of groups, the interactive user interface being usable by a user for improving a security level of the computing environment.

* * * * *